(12) United States Patent
Eleftheriadis et al.

(10) Patent No.: US 9,071,883 B2
(45) Date of Patent: *Jun. 30, 2015

(54) SYSTEM AND METHOD FOR IMPROVED VIEW LAYOUT MANAGEMENT IN SCALABLE VIDEO AND AUDIO COMMUNICATION SYSTEMS

(71) Applicant: Vidyo, Inc., Hackensack, NJ (US)

(72) Inventors: Alexandros Eleftheriadis, Tenfly, NJ (US); James P. Adragna, Oakland, NJ (US)

(73) Assignee: Vidyo, Inc., Hackensack, NJ (US)

( * ) Notice: Subject to any disclaimer, the term of this patent is extended or adjusted under 35 U.S.C. 154(b) by 239 days.

This patent is subject to a terminal disclaimer.

(21) Appl. No.: 13/800,718

(22) Filed: Mar. 13, 2013

(65) Prior Publication Data
US 2013/0198795 A1    Aug. 1, 2013

Related U.S. Application Data

(63) Continuation of application No. 12/481,354, filed on Jun. 9, 2009, now Pat. No. 8,421,840.

(60) Provisional application No. 61/060,072, filed on Jun. 9, 2008.

(51) Int. Cl.
*H04N 21/654* (2011.01)
*H04N 7/15* (2006.01)
(Continued)

(52) U.S. Cl.
CPC ............. *H04N 21/654* (2013.01); *H04N 7/152* (2013.01); *H04N 21/234327* (2013.01);
(Continued)

(58) Field of Classification Search
CPC .............................. H04N 7/152; H04N 21/654
USPC .................. 340/571; 348/14.08, 14.09, 14.12, 348/390.1; 370/229, 252; 375/240.1, 375/240.02, 240.16, 240.21, 240.27; 725/118
See application file for complete search history.

(56) References Cited

U.S. PATENT DOCUMENTS 6,091,777 A  *  7/2000  Guetz et al. .............. 375/240.11
6,167,084 A     12/2000  Wang et al.
(Continued)

FOREIGN PATENT DOCUMENTS

CN     101027905      8/2007
CN     101094381      12/2007
(Continued)

OTHER PUBLICATIONS

Extended European Search Report for EP Application No. 09763448.9, dated Aug. 19, 2013 (Corresponds to U.S. Appl. No. 13/800,718).
(Continued)

*Primary Examiner* — Gerald Gauthier
(74) *Attorney, Agent, or Firm* — Baker Botts L.L.P.

(57) ABSTRACT

A system and method for transmitting a plurality of video signals scalably coded into layers including a base layer and one or more enhancement layers and associated audio signals, if any, over a communication network for presentation to one or more end users. A layout to display the plurality of video signals is determined based on a set of criteria and only the data of the video signal layers that are necessary for displaying the video signals in the determined layout, and any associated audio signals, is selectively transmitted over the communication network.

41 Claims, 19 Drawing Sheets

(51) Int. Cl.

| | |
|---|---|
| *H04N 21/2343* | (2011.01) |
| *H04N 21/2662* | (2011.01) |
| *H04N 21/462* | (2011.01) |
| *H04N 21/485* | (2011.01) |
| *H04N 21/431* | (2011.01) |
| *H04N 21/6587* | (2011.01) |

(52) U.S. Cl.
 CPC ...... *H04N 21/2662* (2013.01); *H04N 21/4622* (2013.01); *H04N 21/4858* (2013.01); *H04N 21/4314* (2013.01); *H04N 21/6587* (2013.01)

(56) References Cited

U.S. PATENT DOCUMENTS

| | | | |
|---|---|---|---|
| 6,215,766 B1 * | 4/2001 | Ammar et al. | 370/229 |
| 6,480,547 B1 * | 11/2002 | Chen et al. | 375/240.27 |
| 6,496,217 B1 | 12/2002 | Piotrowski | |
| 6,498,865 B1 | 12/2002 | Brailean et al. | |
| 6,789,123 B2 | 9/2004 | Li et al. | |
| 6,996,173 B2 * | 2/2006 | Wu et al. | 375/240.1 |
| 7,085,843 B2 | 8/2006 | Buddhikot et al. | |
| 7,139,015 B2 | 11/2006 | Eshkoli et al. | |
| 7,461,126 B2 | 12/2008 | Berkeland et al. | |
| 7,477,281 B2 | 1/2009 | Chandra et al. | |
| 7,480,252 B2 * | 1/2009 | Van Der Schaar | 370/252 |
| 7,593,032 B2 | 9/2009 | Civanlar et al. | |
| 7,902,981 B2 * | 3/2011 | Kaise et al. | 340/571 |
| 8,050,326 B2 * | 11/2011 | Yoon et al. | 375/240.16 |
| 8,059,721 B2 | 11/2011 | Chang et al. | |
| 8,111,932 B2 | 2/2012 | Tu et al. | |
| 8,189,659 B2 * | 5/2012 | Han et al. | 375/240.02 |
| 8,279,260 B2 | 10/2012 | Civanlar et al. | |
| 8,289,370 B2 * | 10/2012 | Civanlar et al. | 348/14.12 |
| 8,421,840 B2 * | 4/2013 | Eleftheriadis et al. | 348/14.08 |
| 8,502,858 B2 * | 8/2013 | Civanlar et al. | 348/14.08 |
| 2005/0002458 A1 * | 1/2005 | Bruls et al. | 375/240.21 |
| 2005/0122389 A1 | 6/2005 | Miao | |
| 2005/0200757 A1 * | 9/2005 | Pica et al. | 348/390.1 |
| 2005/0264648 A1 | 12/2005 | Vashin et al. | |
| 2007/0200923 A1 | 8/2007 | Eleftheriadis et al. | |
| 2007/0274340 A1 | 11/2007 | Raveendran et al. | |
| 2007/0291108 A1 | 12/2007 | Huber et al. | |
| 2008/0068446 A1 | 3/2008 | Barkley et al. | |
| 2008/0068449 A1 | 3/2008 | Wu et al. | |
| 2008/0275974 A1 | 11/2008 | Rackiewicz | |
| 2009/0198827 A1 | 8/2009 | Hughes | |
| 2010/0002069 A1 * | 1/2010 | Eleftheriadis et al. | 348/14.08 |
| 2010/0325676 A1 | 12/2010 | Kim et al. | |
| 2011/0087797 A1 | 4/2011 | Costa et al. | |
| 2013/0198795 A1 * | 8/2013 | Eleftheriadis et al. | 725/118 |
| 2013/0201279 A1 * | 8/2013 | Civanlar et al. | 348/14.09 |

FOREIGN PATENT DOCUMENTS

| | | |
|---|---|---|
| JP | 2005-516557 A | 6/2005 |
| JP | 2007-081863 | 3/2007 |
| WO | WO 03/065720 | 8/2003 |
| WO | WO 2007/076486 | 7/2007 |
| WO | WO 2008/027724 | 3/2008 |

OTHER PUBLICATIONS

U.S. Appl. No. 12/481,354, Mar. 12, 2013 Issue Fee payment.
U.S. Appl. No. 12/481,354, Dec. 13, 2012 Notice of Allowance.
U.S. Appl. No. 12/481,354, Dec. 4, 2012 Response to Non-Final Office Action.
U.S. Appl. No. 12/481,354, Jun. 4, 2012 Non-Final Office Action.
JP Office Action mailed Jan. 5, 2015 in JP Patent Application No. 2014-041323.

* cited by examiner

FIG. 1: System Architecture
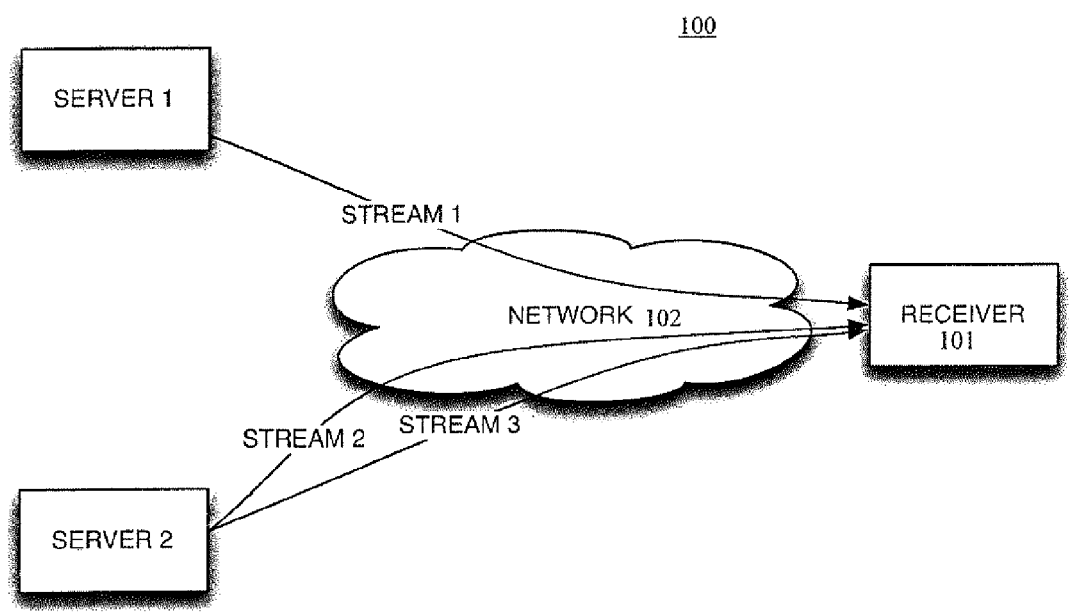

FIG. 2: Receiver-Server (MCU) Communication (Prior Art)
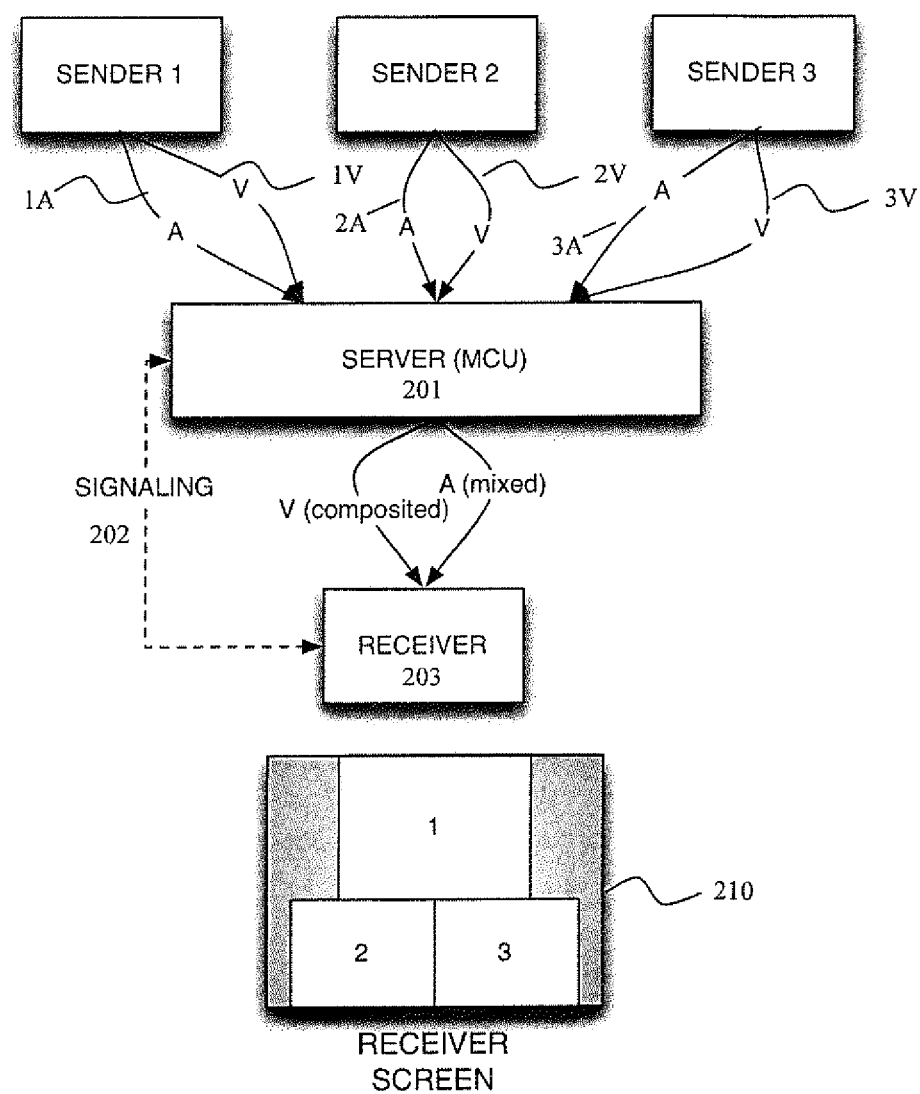

FIG. 3: Receiver-Server Communication with Scalable Coding
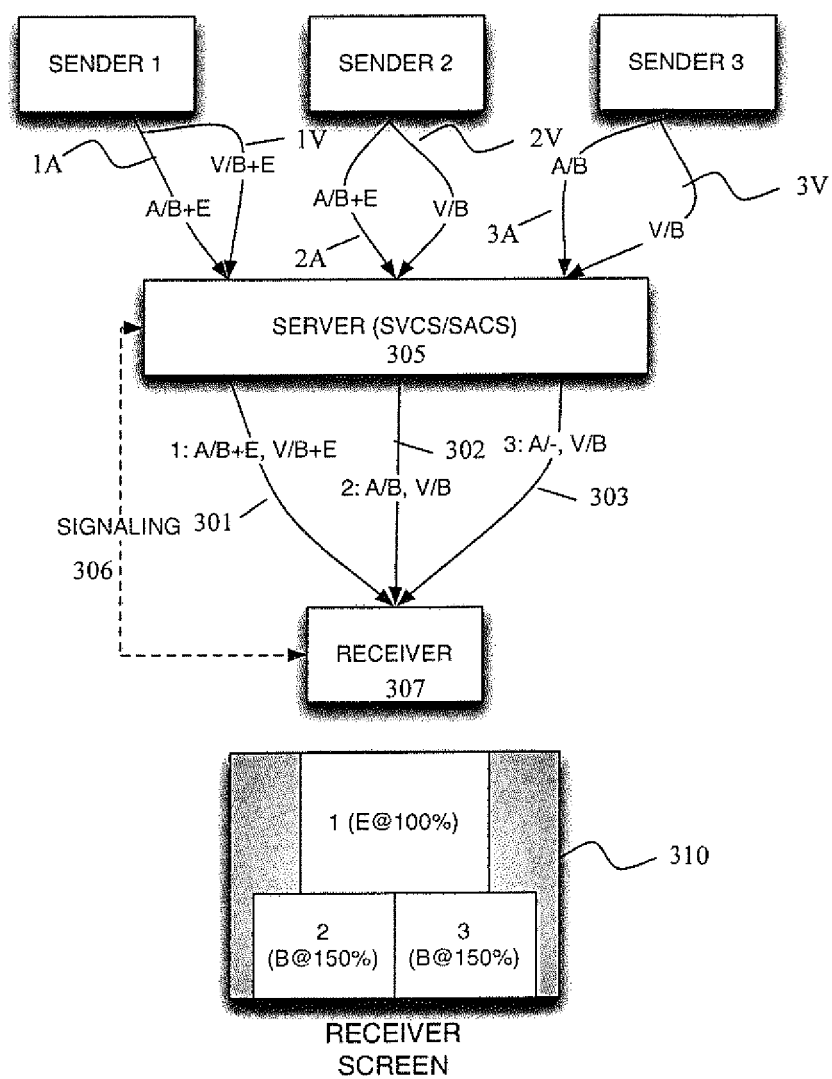

FIG. 4: Exemplary Rectangular Standard Mode Layouts
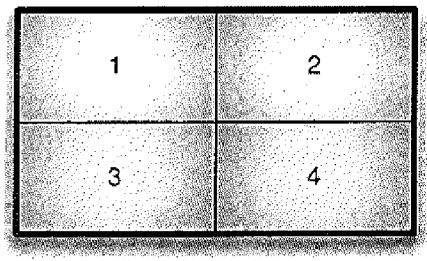
FIG. 4(a) 4-way, rectangular matrix
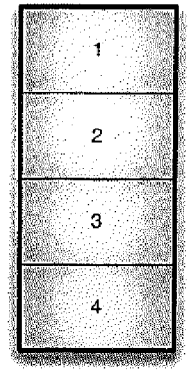
FIG. 4(b) 4-way, rectangular vertical
FIG. 4(c) 4-way, rectangular horizontal
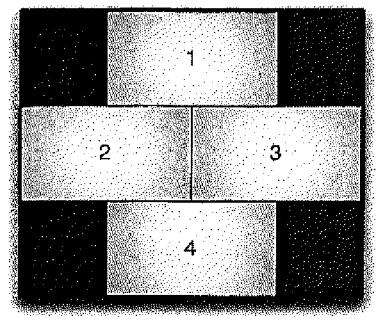
FIG. 4(d) 4-way, rectangular staggered
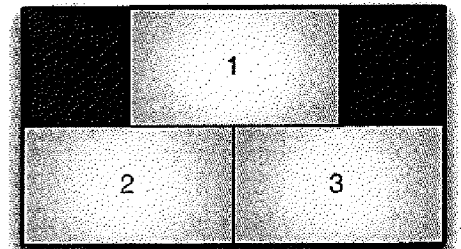
FIG. 4(e) 3-way, rectangular staggered
FIG. 4(f) 3-way, rectangular horizontal
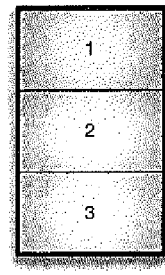
FIG. 4(g) 3-way, rectangular vertical

FIG. 5: View Spread of Rectangular Matrix and Staggered Layouts
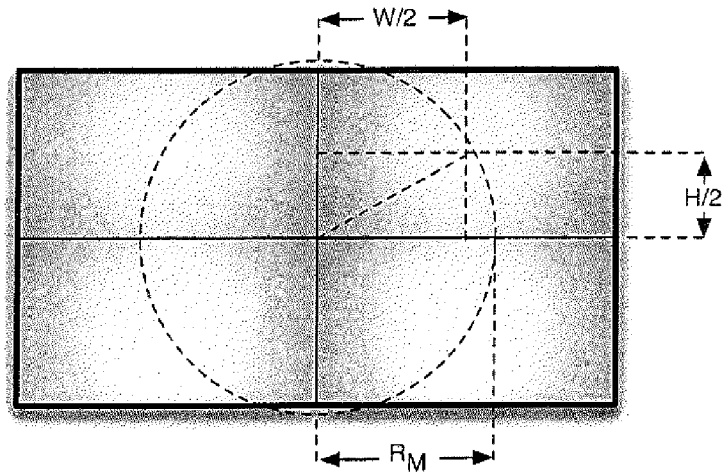
FIG. 5(a) Radius of smallest circle enclosing centers of views – 2x2 rectangular matrix
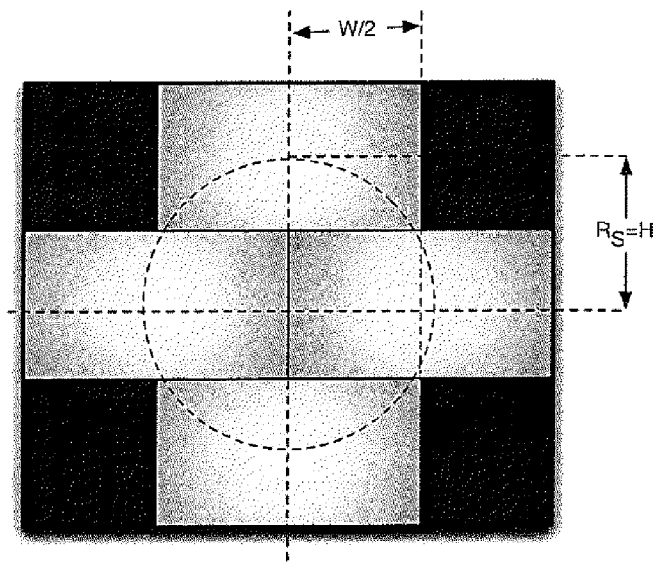
FIG. 5(b) Radius of smallest circle enclosing centers of views – 1x2x1 staggered

FIG. 6: Exemplary Hexagonal Layouts (Standard and Enlarged)
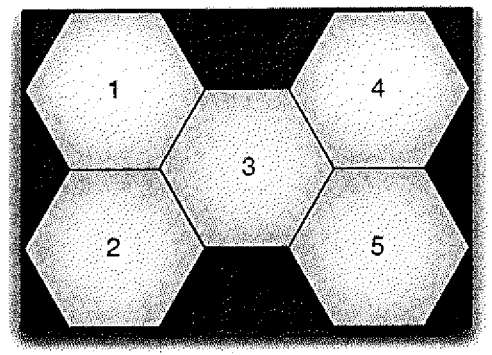
FIG. 6(a) 5-way hexagonal standard layout
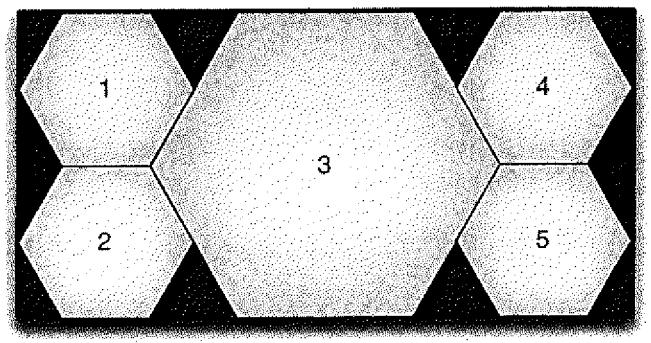
FIG. 6(b) 5-way hexagonal enlarged layout
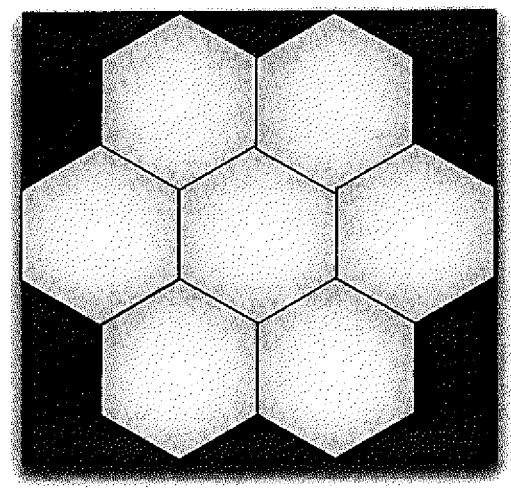
FIG. 6(c) 7-way rotated hexagonal standard layout FIG. 7: View Spread of the Hexagonal Layout
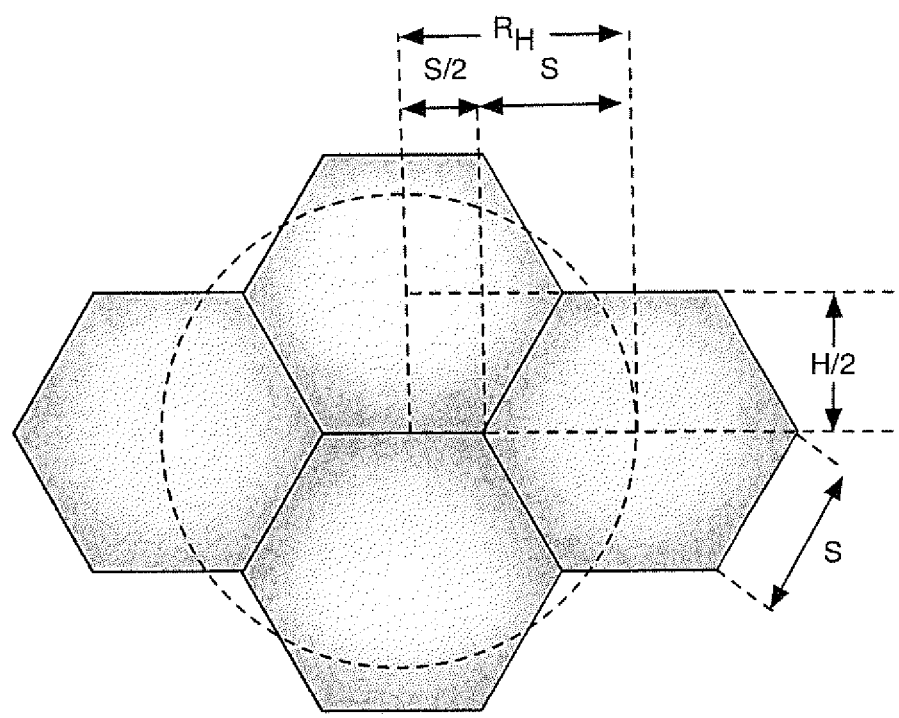

FIG. 8: Exemplary Enlarged Mode Layouts
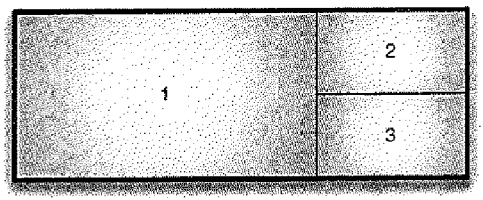
FIG. 8(a) 3-way, rectangular horizontal
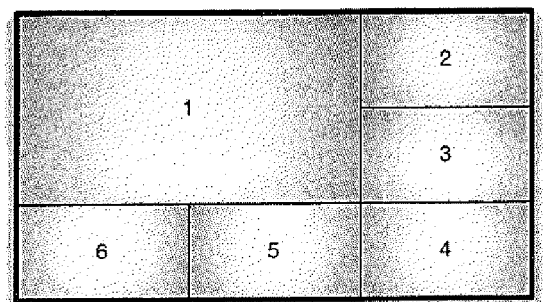
FIG. 8(b) 6-way, rectangular matrix
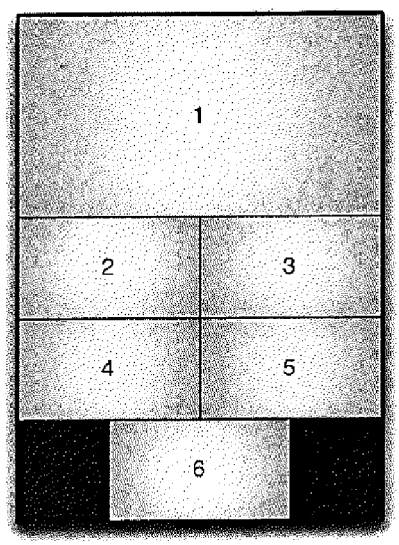 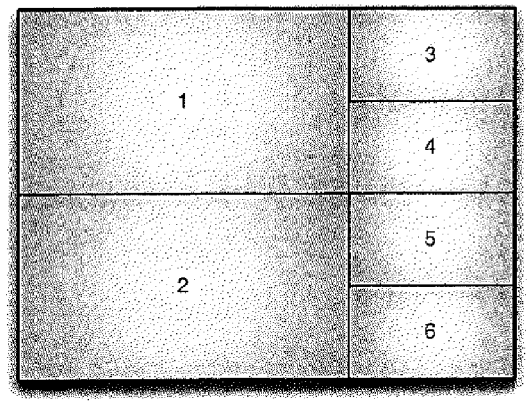
FIG. 8(c) 6-way, rectangular vertical     FIG. 8(d) 6-way, 2 enlarged views, rectangular matrix

FIG. 9: Enlarged Mode Layouts with Staggered and Hexagonal Configurations
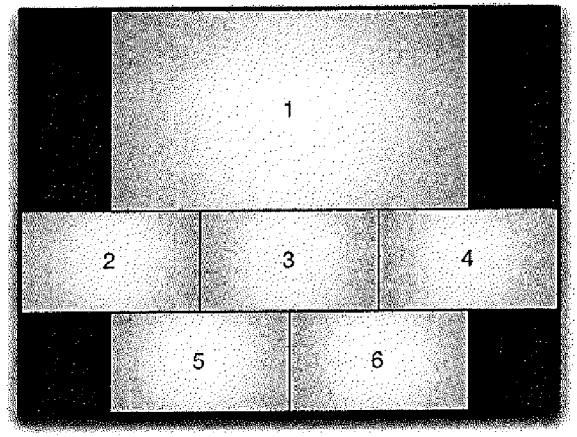
FIG. 9(a) 6-way enlarged mode layout with staggered rectangular views
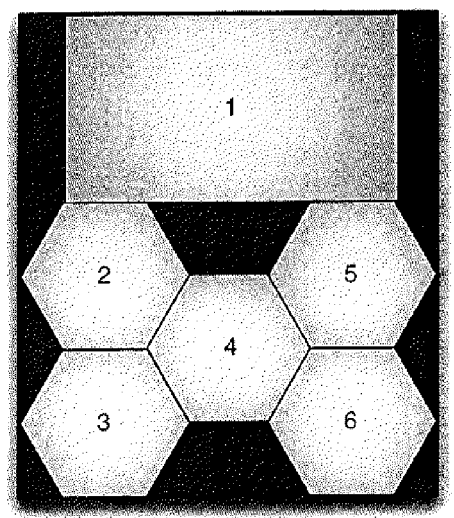 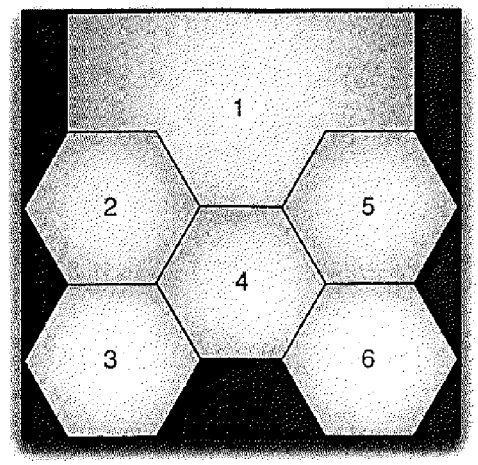
FIG. 9(b) 6-way enlarged mode layout with hexagonal views
FIG. 9(c) 6-way enlarged mode layout with recessed active and hexagonal views FIG. 10: User Interface - Standard Layout
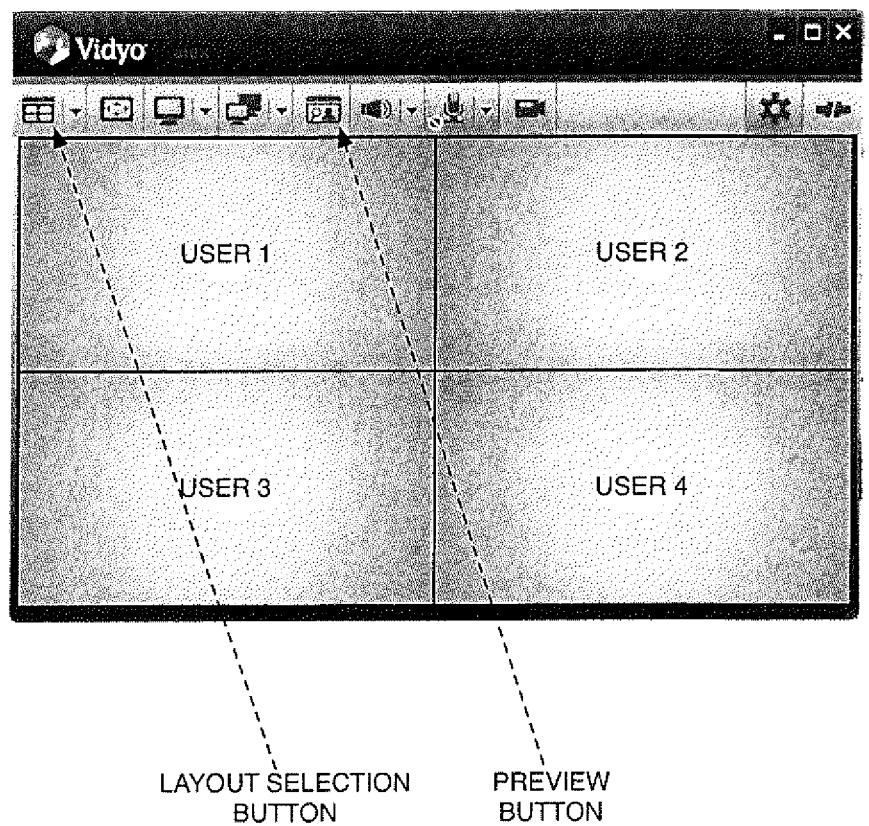

FIG. 11: User Interface - Active Speaker Layout
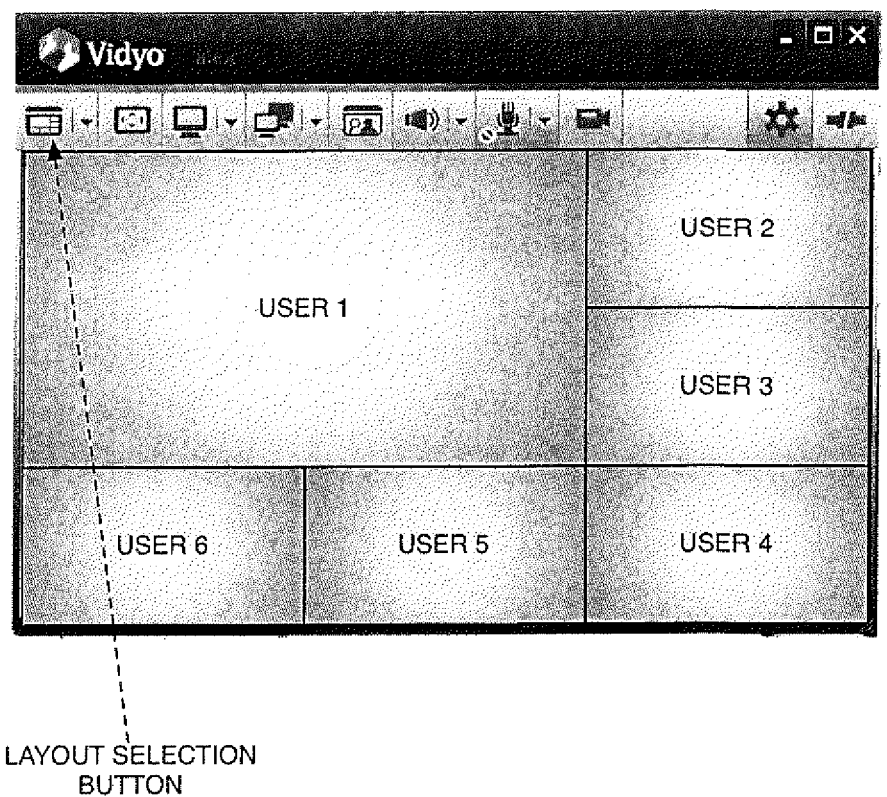

FIG. 12: Selection of Number of Views
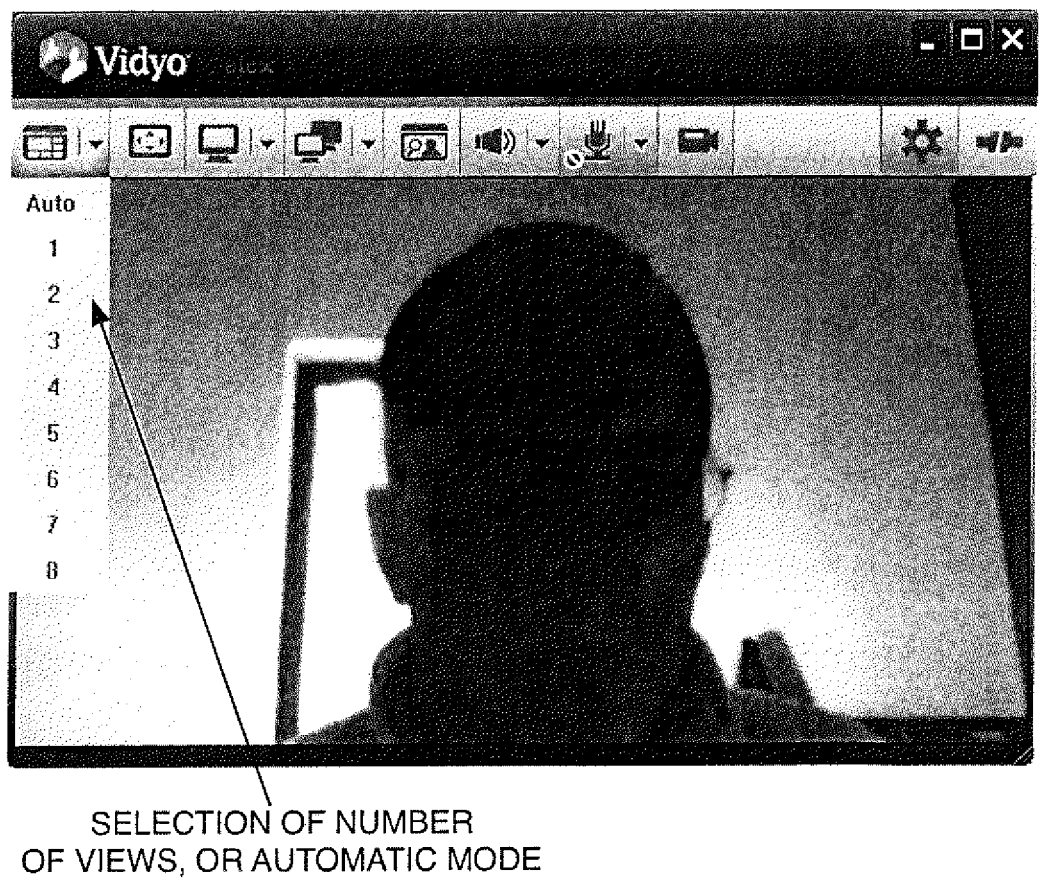
SELECTION OF NUMBER
OF VIEWS, OR AUTOMATIC MODE

FIG. 13: Example Layout Table Entry

FIG. 13(a) Example Table Entry: {4, 4, {1, 0, 2}, {0, 2, 2}, {2, 2, 2}}

FIG. 13(b) Reflected Example Table Entry: {4, 4, {0, 1, 2}, {2, 0, 2}, {2, 2, 2}}

FIG. 14: Sizing and Positioning of a Layout on a Target Screen Size
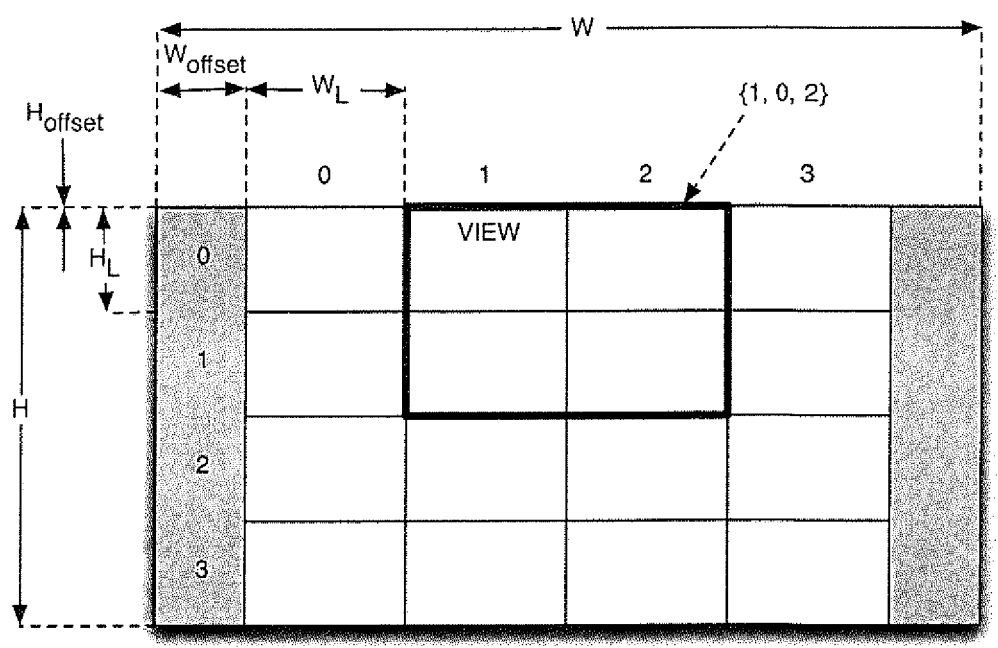

FIG. 15: Block diagram of layout selection process
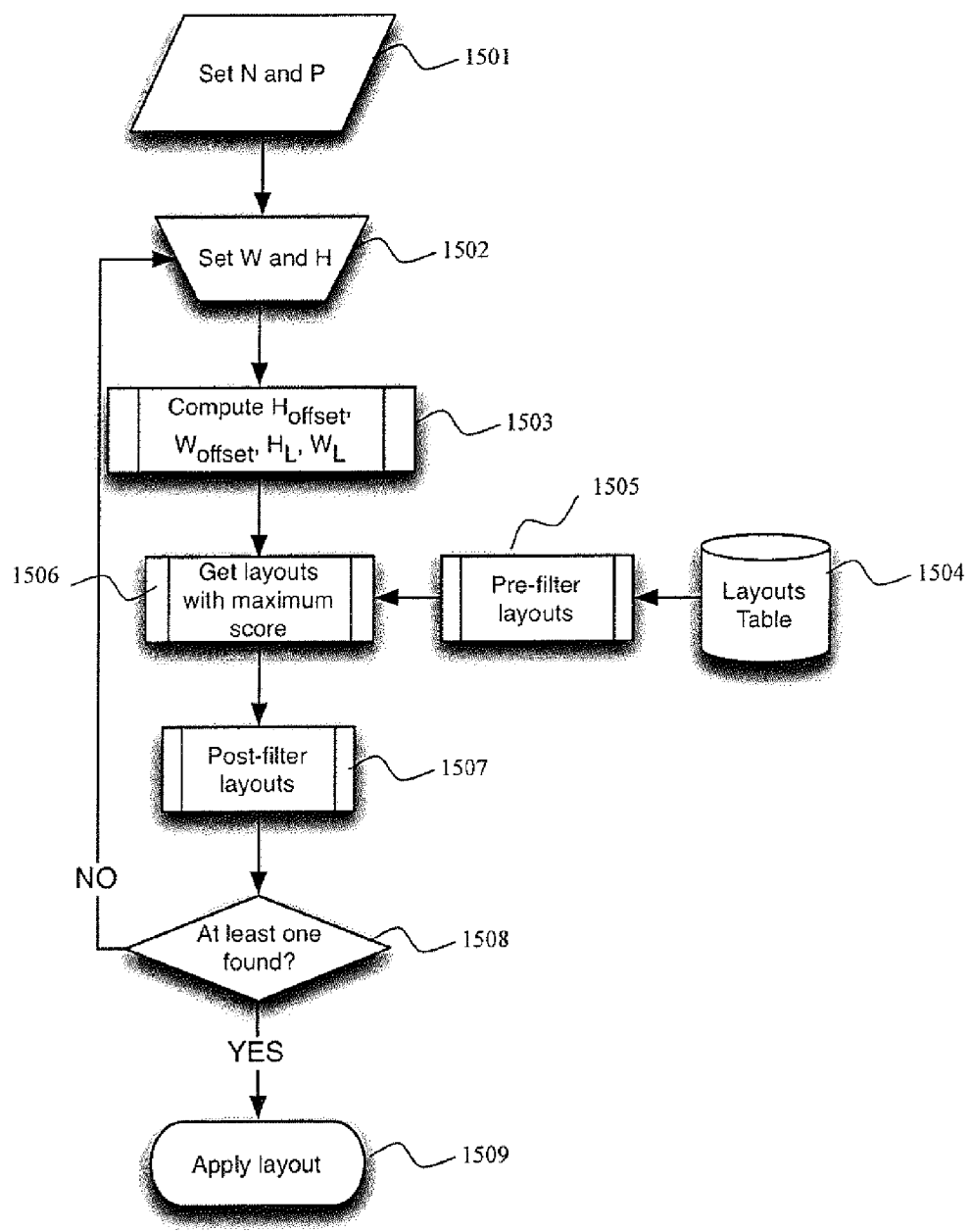

FIG. 16: Block diagram of view allocation process – layout initialization
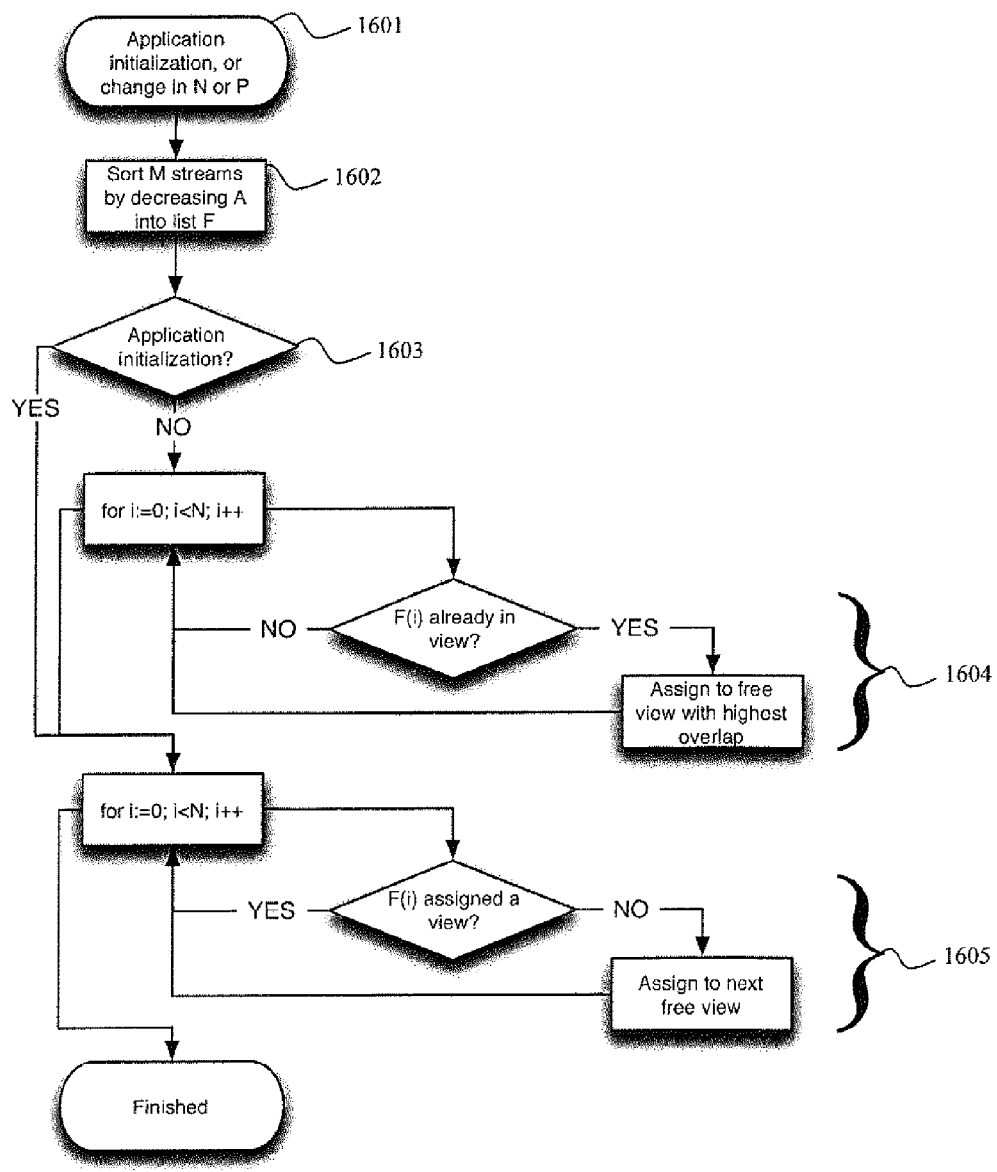

FIG. 17A: Block diagram of view allocation process -- layout reprocessing
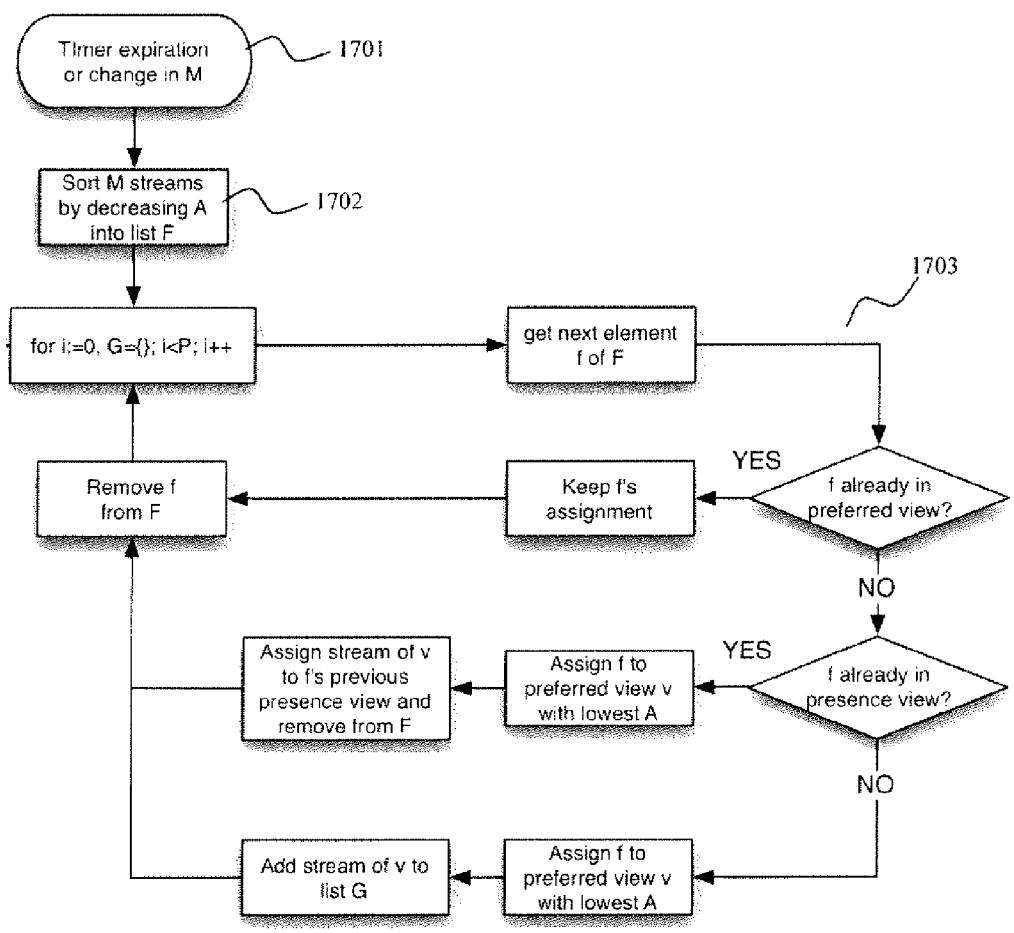

FIG. 18: Cropping and manual panning of views

SYSTEM AND METHOD FOR IMPROVED VIEW LAYOUT MANAGEMENT IN SCALABLE VIDEO AND AUDIO COMMUNICATION SYSTEMS

CROSS-REFERENCE TO RELATED APPLICATIONS

This application is a continuation of U.S. patent application Ser. No. 12/481,354 filed Jun. 9, 2009 which claims priority from U.S. provisional application No. 61/060,072 filed Jun. 9, 2008 entitled "System and Method for Improved View Layout Management in Scalable Video and Audio Communication Systems."

This application is related to International patent application Nos. PCT/US06/028365 entitled "System and Method for Scalable and Low-Delay Videoconferencing Using Scalable Video Coding" and PCT/US06/62569 entitled "System and Method for Videoconferencing Using Scalable Video Coding and Compositing Scalable Video Conferencing Servers," which are commonly assigned, are hereby incorporated by reference herein in their entireties.

FIELD

The present application relates to video communication systems. In particular, it relates to mechanisms for managing the layout of multiple views of different scalable video sources on one or more displays.

BACKGROUND ART

There are several applications in which multiple video views can be presented on one or more video displays. One example is multipoint videoconferencing systems, where one or more video streams arrive at a receiver and must be presented on a common display. High-end videoconferencing systems in fact may employ two or more displays for that purpose. As the number of participants grows, it becomes impossible to fit all the video windows on a given display area. At the same time, if the display is that of a computer, it may be shared by other applications and thus the user may restrict the videoconferencing application window to a subset of the computer's screen. Another example is a video surveillance application, where feeds from multiple cameras may arrive at a control station, where again they have to be displayed in one or more physical display devices (computer or TV monitors). Yet another application is multi-program television, where a single device displays multiple programs at the same time. Moreover, with video programming increasingly being available on the Internet, it is easy to create players that provide functionality similar to the traditional picture-in-picture mode of analog or digital TVs, but with a larger set of views.

The organization of multiple views on a given screen is typically performed following a rectangular grid organization pattern. For example, with four feeds of the same size, one can partition the screen area into a rectangular array of 2-by-2 smaller views or windows, and display each feed in its own window. Typically, the smaller views contain scaled down versions of the original feeds, so that they fit within the allocated screen area. In conversational applications such as videoconferencing, it is also common to display the active speaker in a larger view, e.g., occupying one of the corners of the screen, with other participants shown in smaller views surrounding the main one at its sides.

In traditional videoconferencing systems that use a transcoding Multipoint Control Unit (MCU), the composition of the individual feeds happens at the MCU itself. The MCU receives the incoming feeds from transmitting participants, decodes them, and composes them into a new frame after appropriate downscaling. It then encodes the composited signal and transmits it to the intended recipient(s). If the MCU supports personalized layout, then the composition and encoding are performed individually for each recipient. A given participant selects the desired layout, and informs the MCU in order for it to produce the desired composition. The composition options are pre-configured at the MCU, and any changes to the available patterns require its redesign or reprogramming.

In a general setting of a video player receiving and displaying multiple video sources, possibly also originating from different locations, it is the responsibility of the player to scale down and compose the individual video pictures to the displayed picture. This provides complete flexibility to the player to organize the layout in any way it chooses, but it also results in a total bit rate requirement that is the sum of the bit rates of the individual sources. In contrast, in a videoconferencing setting with a transcoding MCU, the bit rate of the received composited signal is that of a single video source. It is noted, however, that the need of the MCU to decode and re-encode the video streams adds considerable latency, and also requires substantial computational power.

A fundamental limitation in resolving the tradeoff between flexibility, complexity, and bit rate overhead in systems featuring multiple video views, is the fact that such systems typically operate using traditional single-layer video codecs, such as H.264 AVC, VC-1, MPEG-4, MPEG-2, and VP6/VP7. An alternative coding technique is layered or scalable coding. Scalable coding is used to generate two or more "scaled" bitstreams collectively representing a given medium in a bandwidth-efficient manner at a corresponding number of fidelity points. Scalability can be provided in a number of different dimensions. For example, a video signal may be scalable coded in different layers at CIF and QCIF resolutions, and at frame rates of 7.5, 15, and 30 frames per second (fps). Depending on the codec's structure, any combination of spatial resolutions and frame rates may be obtainable from the coded bitstream. The bits corresponding to the different layers can be transmitted as separate bitstreams (i.e., one stream per layer) or they can be multiplexed together in one or more bitstreams. For convenience in description herein, the coded bits corresponding to a given layer may be referred to as that layer's bitstream, even if the various layers are multiplexed and transmitted in a single bitstream.

Video codecs specifically designed to offer scalability features include, for example, MPEG-2 (ISO/IEC 13818-2, also known as ITU-T H.262) and the currently developed H.264 Scalable Video Coding (H.264 SVC) extension (Annex G of ITU-T Recommendation H.264, November 2007, incorporated herein by reference in its entirety). Scalable audio codecs include ITU-T G.729.1 and Speex (see www.speex.org).

Scalable video coding (SVC) techniques specifically designed for video communication are also described in commonly assigned international patent application No. PCT/US06/028365 "System and Method for Scalable and Low-Delay Videoconferencing Using Scalable Video Coding." It is noted that even codecs that are not specifically designed to be scalable can exhibit scalability characteristics in the temporal dimension (e.g., MPEG-2 or H.264 AVC).

Scalable codecs typically have a pyramidal bitstream structure. Using H.264 SVC as an example, a first fidelity point is obtained by encoding the source using standard H.264 techniques (Advanced Video Coding—AVC). An additional fidelity point can be obtained by encoding the resulting coding error (the difference between the original signal and the decoded version of the first fidelity point) and transmitting it in its own bitstream. This pyramidal construction is quite common (e.g., it was used in MPEG-2 and MPEG-4). The first (lowest) fidelity level bitstream is referred to as the base layer, and the bitstreams providing the additional fidelity points are referred to as enhancement layers. The fidelity enhancement can be in any fidelity dimension. For example, for video it can be temporal (frame rate), quality (Signal-to-Noise ratio or SNR), spatial (picture size), or 3-D (e.g., with a stereoscopic enhancement layer). For audio, it can be temporal (samples per second), quality (SNR), or additional channels.

Another example of a scalable or layered representation is multiple description coding. Here the construction is not pyramidal: each layer is independently decodable and provides a representation at a basic fidelity; if more than one layer is available to the decoder, however, then it is possible to provide a decoded representation of the original signal at a higher level of fidelity. One example is transmitting the odd and even pictures of a video signal as two separate bitstreams. Each bitstream alone offers a first level of fidelity, whereas any information received from other bitstreams can be used to enhance this first level of fidelity. In this sense, any of the streams may act as a base layer. If all streams are received, then a complete representation of the original signal at the maximum level of quality afforded by the particular representation is obtained.

Yet another example of a layered representation is simulcasting. In this case, two or more independent representations of the original signal are encoded and transmitted in their own streams. This is often used, for example, to transmit Standard Definition TV material and High Definition TV material. It is noted that simulcasting is a special case of pyramidal scalable coding where no inter-layer prediction is used. In the following, all such layered coding techniques are referred to as scalable coding, unless explicitly specified otherwise.

Scalable coding offers significant advantages for packet-based video and audio communication, including reduced delay, reduced complexity, and improved system scalability. International Patent Application No. PCT/US06/028365 discloses techniques where the Scalable Video Communication Server ("SVCS") (or Scalable Audio Communication Server ("SACS"), in the case of a scalable audio signal) may utilize the scalable aspects of the audio signal to ensure smooth transitions between speakers by transmitting the full resolution signal for the active speaker and base layer only for a number of other participants (prioritized by, for example, computed volume).

For example, SVCS units hosted on standard PC-based hardware platforms can support 100 users or more. The ability to effectively host sessions with a large number of users poses challenges for view layout management as, for example, with more than 10-15 users it becomes difficult to effectively combine all users on a single display. The disclosed subject matter presents systems and methods for effectively managing view layout in such systems.

SUMMARY

The disclosed subject matter utilizes scalable coding and provides techniques for managing the layout of multiple video views so that complete flexibility is provided to end users in terms of screen size, aspect ratio, and number of views to include, while at the same time reducing the bit rate requirements. The disclosed subject matter also provides techniques for automating the layout of multiple video views using a combination of user preferences and ancillary data that can be provided by a server or computed locally at the receiver.

Embodiments of the disclosed subject matter include an audiovisual communication system for transmitting a plurality of video signals and associated audio signals, if any, over a communication network for presentation to one or more end users, wherein the video signals are scalably coded into layers including a base layer and one or more enhancement layers. A receiver receives the plurality of video and any associated audio signals, determines a layout for the displayed video signals based on a set of criteria, and communicates information about the determined layout. A display displays one or more of the received video signals using the determined layout. One or more servers receive the information about the determined layout and transmit the plurality of video and any associated audio signals over the communication network. The one or more servers are configured to selectively transmit, for each of the plurality of video signals, no layers, the base layer, or the base layer and one or more enhancement layers, if any, that are necessary for displaying the video signals in the determined layout.

In some embodiments of the disclosed subject matter, audio signals scalably coded into layers including a base layer and one or more enhancement layers in which the one or more servers selectively transmit only the data of the audio signal layers that are necessary for the determined layout.

In some embodiments of the disclosed subject matter the one or more servers determine which of the audio signals to selectively transmit by using audio activity indicators for each of the associated audio signals and an indication of whether the associated video signal is displayed in the determined layout, such that audio signal data is transmitted for one or more of the audio signals with the highest activity and audio signal data associated with one or more of the video signals that are displayed in the determined layout is transmitted, and no audio signal data is transmitted associated with the remaining video signals.

Embodiments of the disclosed subject matter include a method for transmitting a plurality of video signals scalably coded into layers including a base layer and one or more enhancement layers and associated audio signals, if any, over a communication network for presentation to one or more end users, including determining a layout to display the plurality of video signals based on a set of criteria, communicating information about the determined layout, selectively transmitting only the data of the video signal layers that are necessary for displaying the video signals in the determined layout and any associated audio signals, receiving the selectively transmitted data, and displaying the plurality of video signals utilizing the determined layout.

Embodiments of the disclosed subject matter also include a system for presenting a plurality of video signals and associated audio signals, if any, received over a communication network from one or more servers, wherein the video signals are scalably coded into layers including a base layer and one or more enhancement layers. A receiver receives the plurality of video and any associated audio signals from the communication network, determine a layout for the display of one or more of the received video signals based on a set of criteria, and communicates the determined layout over the communications network as feedback including instructions for the selective transmission of the video signal layers, if any, in the determined layout. A display connected to the receiver displays one or more of the received video signals using the determined layout.

Embodiments of the disclosed subject matter also include a system for transmitting a plurality of video signals and one or more associated audio signals, wherein the video signals are scalably coded into layers including a base layer and one or more enhancement layers. One or more servers receive instructions for the selective transmission of the video signal layers corresponding to a determined layout and selectively transmit only the data of the video signal layers that are necessary for displaying the video signals in the determined layout.

BRIEF DESCRIPTION OF THE DRAWINGS

FIG. 1 is a block diagram illustrating the general architecture of an exemplary audio and video communication system delivering multiple scalable video and audio streams from one or more servers to a receiver, in accordance with the principles of the disclosed subject matter;

FIG. 2 is a block diagram illustrating an audio and video conferencing system that uses a transcoding MCU as a server;

FIG. 3 is a block diagram illustrating the architecture of an audio and video communication system that uses scalable video and audio coding, and which delivers multiple audio and video streams to a receiver via an SVCS/SACS server, and where the streams are composited/mixed on the receiver, in accordance with the principles of the disclosed subject matter;

FIG. 4(a)-(g) depict exemplary standard mode rectangular views, in accordance with the principles of the disclosed subject matter;

FIG. 5(a)-(b) are diagrams illustrating the parameters used to calculate the view spread of the staggered rectangular layout and the matrix rectangular layout, in accordance with the principles of the disclosed subject matter;

FIG. 6(a)-(c) depict exemplary standard mode and enlarged mode hexagonal layouts, including rotated hexagonal, in accordance with the principles of the disclosed subject matter;

FIG. 7 is a diagram illustrating the parameters used to demonstrate the lower view spread of the (rotated) hexagonal layout versus the rectangular matrix and staggered layouts, in accordance with the principles of the disclosed subject matter;

FIG. 8(a)-(d) depict exemplary enlarged mode rectangular views, in accordance with the principles of the disclosed subject matter;

FIG. 9(a)-(c) depict exemplary combinations of a enlarged mode, using staggered rectangular and hexagonal views, including a recessed enlarged view, in accordance with the principles of the disclosed subject matter;

FIG. 10 depicts an exemplary user interface of a videoconferencing application at a receiver, including a layout selection button that is switched to a standard mode layout view, and a preview button, in accordance with the principles of the disclosed subject matter;

FIG. 11 depicts an exemplary user interface of a videoconferencing application at a receiver, including a layout selection button that is switched to enlarged mode layout view, in accordance with the principles of the disclosed subject matter;

FIG. 12 depicts an exemplary user interface of a videoconferencing application at a receiver, including a drop-down menu for selecting the number of views to be shown on the screen, or selection of an automatic view determination mode, in accordance with the principles of the disclosed subject matter;

FIG. 13(a)-(b) depicts an example layout table entry and its corresponding reflection, in accordance with the principles of the disclosed subject matter;

FIG. 14 depicts the sizing and positioning of a layout on a target screen size, in accordance with the principles of the disclosed subject matter;

FIG. 15 depicts a block diagram of the layout selection process, in accordance with the principles of the disclosed subject matter;

FIG. 16 depicts a block diagram of the layout reprocessing part of the view allocation process, in accordance with the principles of the disclosed subject matter;

Figure 17B:
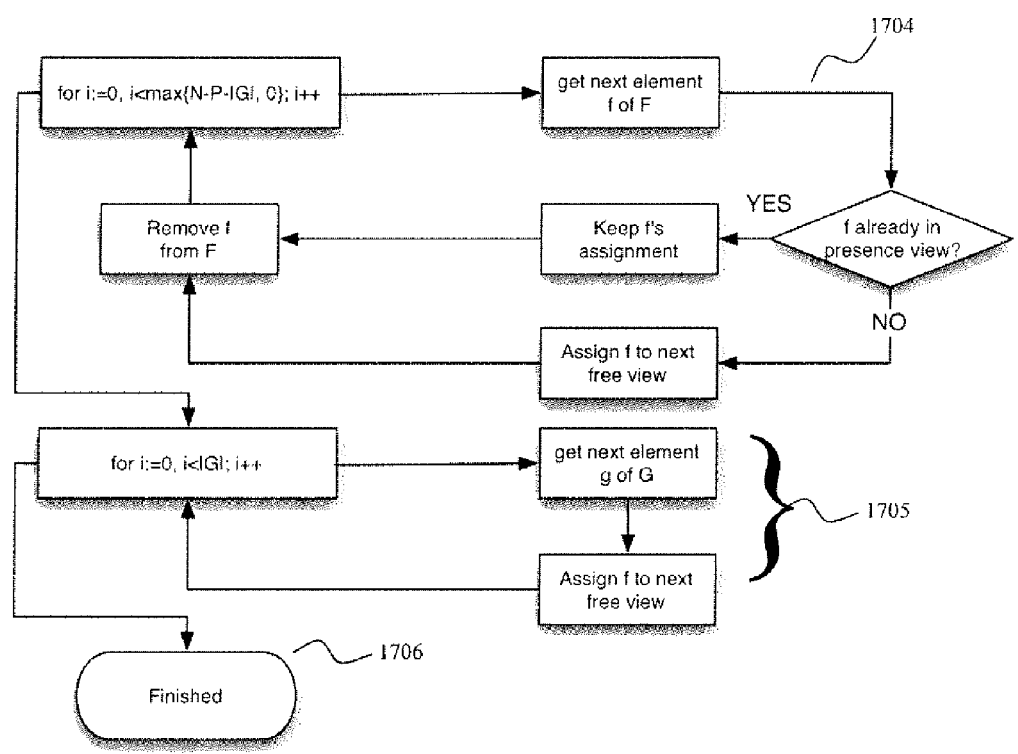
FIG. 17 depicts a block diagram of the layout initialization part of the view allocation process, in accordance with the principles of the disclosed subject matter.

Throughout the figures the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

FIG. 1 depicts a system architecture 100 in accordance with an exemplary embodiment, where one or more servers provide video and audio streams to a Receiver 101 over a Network 102, FIG. 1 shows two such servers, with Server 1 providing Stream 1, and Server 2 providing two streams, Stream 2 and Stream 3. Server 1 and Server 2 can be Scalable Video Communication Server (SVCS) systems and/or Scalable Audio Communication Server (SACS) systems, which forward data received from other participants (not shown in the figure) to the receiver, or they can be stand-alone media servers (e.g., accessing content from storage). It is noted that "participants" here can also be transmitting-only systems, such as units that perform encoding only (e.g., a system that encodes and transmits a live TV signal).

An exemplary embodiment uses the well-known, commercially-available H.264 standard for encoding the video signals and the Speex scalable codec for audio (see the web site www.speex.org). Some of the streams can be encoded using single-layer AVC, whereas some others can be encoded using its scalable extension SVC. Similarly, some of the Speex audio streams can contain only narrowband data (8 KHz), whereas others can contain narrowband as well as, or separately, wideband (16 KHz) or ultra-wideband (32 KHz) audio. Alternate scalable codecs may be used, such as MPEG-4/Part 2 or H.263++ for video, or G.729.1 (EV) for audio.

The Network can be any packet-based network; e.g., an IP-based network, such as the Internet.

In an exemplary embodiment, the Receiver is a general-purpose computer such as PC or Apple computer, desktop or laptop, running a software application. The Receiver can also be a dedicated computer that is engineered to only run the single software application, for example using embedded versions of commercial operating systems, or even a standalone device engineered to perform the functions of the receiving application. The software application is responsible for communicating with the server(s) for establishing connections as well as receiving, decoding, and displaying or playing back received video and/or audio streams. It can also be transmitting back to a server its own encoded video and/or audio stream. Such Receiver-originating streams can be the result of real-time encoding of the output of a camera and microphone attached to the Receiver, or they can be pre-coded video and audio stored locally on the Receiver or on a file server accessible from the Receiver over the Network. In one embodiment the Receiver is equipped with a connected camera and microphone, and encodes and transmits the produced video and audio signal to other participants via one or more Servers.

In accordance with the SVCS/SACS architecture, a Receiver is responsible for compositing the decoded video streams received from the Server(s) on its display, and also mixing and playing back the decoded audio streams. It is noted that traditional multi-point video servers such as transcoding MCUs perform this function on the server itself, either once for all receiving participants, or separately for each receiving participant. The ability of a Receiver to perform its own composition offers tremendous flexibility to the user, but may be associated with higher bit rate requirements if not properly designed.

FIG. 2 depicts a typical example of a legacy system with three transmitting participants: Sender 1, Sender 2, and Sender 3, a Server 201, and a Receiver 203. The Server 201 operates as a transcoding MCU: it receives audio (A) streams 1A, 2A and 3A and video (V) streams 1V, 2V and 3V from each of the Senders 1, 2 and 3, respectively, decodes the signals, and composes the video according to the desired layout indicated to the Server 201 by the Receiver 203 via the Signaling path 202. The decoded audio signals are also mixed at the Server 201. The resulting composited video and mixed audio signals are encoded by the Server 201, and are transmitted to the Receiver 203 as two separate streams: mixed audio stream A (mixed) and composited video stream V (composited). It is noted that these streams can actually be transmitted to the Receiver 203 multiplexed over a single connection (e.g., a single Real-Time Protocol (RTP) port). The Receiver 203 decodes the audio and video signals and plays them back. FIG. 2 further depicts an example layout of the Receiver's screen 210, in which Sender 1, displayed in display box 1, is shown larger than Senders 2 and 3, displayed in display boxes 2 and 3, respectively. The total bit rate requirements for the audio and video streams communicated between the Server 201 and the Receiver 203 are that of a single stream at the resolution of the Receiver's screen 210. Note that any areas of the screen not covered by real content (i.e., pixels originating from any one of the participants) have to be encoded by the Server 201 as well. The coding overhead, however, will typically be small since these areas do not change from picture to picture, and thus the predictive coding used in codecs such as 11.264 can reduce the prediction error to a small amount.

If the user operating the Receiver 203 wishes to switch to a different layout, this has to be communicated to the Server 201 via the Signaling path 202, so that the Server 201 changes its composition process. The combination of transmission delay to, and from, the Server 201 as well as any processing delays at the Server 201 will cause a noticeable delay from the time the user makes the request in the application software, and the time the new layout appears on the Receiver's screen 210.

FIG. 3 depicts the same communication scenario shown in FIG. 2, but this time with the assumption that scalable coding is used in the video and audio signals. Specifically, it is assumed that the video signal is coded using 11.264 SVC with two layers of spatial scalability, with a ratio of 2 between the horizontal or vertical picture dimensions between the base and enhancement layers (e.g., VGA and QVGA). Similarly, the audio signal is coded with two layers of scalability, narrowband (base) and wideband (enhancement). The paths 1A, 2A, 3A, 1V, 2V, 3V from each Sender (1, 2, 3) to the Server 305 are labeled according to the type of signal, A for audio and V for video, and the layers present in each stream, B for base and E for enhancement. For the paths 301, 302, 303 from the Server 305 to the Receiver 307, the Sender's number (1 through 3) is added to the label. As an example, "1:A/B+E, V/B" indicates that the stream contains data from Sender 1, in which both base and enhancement layers are present for audio, whereas only the base layer is present for video. Thus path 301 in FIG. 3 is labeled "1:A/B+E, V/B+E", indicating that the stream contains data from Sender 1, with both base and enhancement layers present for both audio and video.

With continued reference to FIG. 3, each of the Senders (1, 2, 3) sends some combination of base and enhancement layers for each of the audio and video signals. The particular choice of layers can be dictated by the available bit rate between a Sender and a Receiver 307, the available equipment available at the Sender (1, 2, 3) (e.g., a low vs. high resolution camera), or other factors. As discussed below, it can also be due to an indication from the Server 305 that the enhancement layer is not needed (for example, a video enhancement layer for a Sender (1, 2, 3) that is not seen in full resolution by any of the receiving participants).

One focus of the disclosed subject matter is the operation of the Receiver 307 and its interaction with the Server 305 when scalable coding is used. It is assumed that the Receiver 307 has selected, at a particular point in time, a certain size for its screen. The size can be the physical size (in pixels) of the Receiver's monitor 310, or it can be a portion of the physical size if the application window is not covering the entire screen. In the following, the word 'screen' is used to indicate without distinction either the entire physical screen (when the application is in full-screen mode or in standalone implementations) or the area of the application window that is available for video display.

It can be further assumed that a particular layout has been chosen by the user at the Receiver 307, in which the video from Sender 1 is shown in full resolution, whereas the video from Sender's 2 and 3 is shown at ¾ of the full resolution. If all video signals have a full resolution of VGA (640×480 pixels), then the view of Sender 1 will have dimensions 640× 480, whereas the views of Senders 2 and 3 will have dimensions 480×360. In order to fit these views, in the layout shown in FIG. 3, while preserving an aspect ratio of 4:3 for the screen, a rectangle of size at least 1120×840 is needed.

The bit rate overhead needed to transmit this composited view from a transcoding MCU can be estimated as follows. It can be assumed that the MCU video encoder operates at a certain fixed average number of bits per pixel. Then the total bit rate required for the composited picture by counting the displayed pixels versus that of a VGA signal can be estimated. The total number of displayed pixels are $1+2*0.75^2$ of a VGA signal, or 2.125. This calculation ignores the blank space, which is assumed to be encodable with a negligible number of bits. The total bit rate for the composited video will therefore be 2.125 times that needed for a single VGA signal coded using single-layer H.264 AVC.

With continued reference to FIG. 3 and the layout assumptions made above, in an exemplary embodiment, the Receiver 307 instructs the Server 305 to:

1) Transmit full resolution video (base and enhancement) for Sender 1,

2) Transmit base layer only for the video from Sender 2, and

3) Transmit base layer only for the video from Sender 3.

The Receiver 307 selects to switch reception of video from Senders 2 and 3 to base only, as it can upsample the base layer signal (QVGA, or 320×240) to the desired ¾ VGA resolution (480×360) with very little visual difference compared with receiving the full resolution VGA signal and downsampling it to ¾ VGA. The upsampling and composition process occurs at the Receiver 307 itself; the Server 305 is only informed about which layer packets to forward to the particular Receiver 307.

The total bit rate required in this case can be estimated as follows. The typical ratio between base and enhancement layer for spatial scalability with a ratio of 2 is 3:1. In other words, the base bit rate is ⅓ of the enhancement layer's bit rate, or 0.25 of the total bit rate. The Server-to-Receiver video path will therefore require 1+2*0.25 or 1.5 of the bit rate of a VGA signal. Accounting for the 10% bit rate overhead associated with scalable versus single-layer coding for achieving the same quality as measured by PSNR, the total bit rate is 1.5*110% or 1.65. Comparing with the transcoding MCU ease (2.125), this technique reduces the bit rate requirements by 22%.

If the Server is neither an SVCS nor an MCU, but simply forwards multiple video streams to the Receiver, then the total bit rate requirement overhead is 3, since there are three views received and displayed. In the absence of scalability or transcoding, the Receiver has no choice but to receive full resolution signals for all views and perform scaling as appropriate. A competitive advantage of the scalable design of the disclosed subject matter is even more significant in this case, providing a 45% bit rate reduction. These gains are further amplified with an increased number of participants.

In the context of audio communication applications, similar gains can be obtained by using the SACS architecture with scalable coding, as compared with a simple forwarding server. It can be assumed here that the "active plus N most recent speakers" technique is used, as described in International Patent Application No. PCT/US06/62569, It can be further assumed that N is 1, the active speaker is from Sender 1 and that the next more recent speaker is Sender 2. It is noted that the voice activity level can be computed at the Sender or the Server itself.

With this information, and given that the layout of FIG. 3 is used, the Server transmits the base and enhancement audio signals from Sender 1, only the base audio layer from Sender 2, and no audio from Sender 3. The total bit rate requirements are slightly higher than that of a transcoding server that performs its own mixing, but less than ⅔ that of a simple forwarding server. As discussed below, the active speaker indication, including the N most recent memory, can be used advantageously in video layout automation (regardless if scalable audio coding is used or not).

The preceding example demonstrates the advantages of using layout management techniques in conjunction with scalable coding and receiver-server signaling, in order to obtain increases flexibility at the receiver yet at much lower bit rate requirements.

Although an example has been explained, the teachings of the disclosure made herein are more generally applicable to a broad spectrum of layouts of practical significance. Layouts can be separated into two major categories, or modes: standard, and enlarged. In the standard mode, all participants (that are shown on the screen) are shown in the same view sizes. In the enlarged mode, one ore more views are shown in a larger size, whereas the others are shown in smaller view sizes. The enlarged views in a videoconferencing setting can correspond to one or more active speakers, as determined by either the Server 305 or the Receiver 307. In applications other than audiovisual communication, e.g., viewing multi-source broadcast content, the enlarged view(s) may be the source(s) that the user at the Receiver 307 selects to be shown in a larger view size.

FIG. 4(*a*)-(*g*) depict exemplary standard mode layouts using rectangular view organization. Each view within a screen is a rectangle. In one embodiment the rectangles can obey the picture aspect ratio of the original signal. FIG. 4(*a*) is a typical 2×2 matrix layout, commonly found in videoconferencing systems. FIG. 4(*b*) is a case where all views are stacked vertically, whereas FIG. 4(*c*) displays them horizontally. Although the screen area appears to be inconsistent with typical monitor screen aspect ratios (16:9 or 4:3), the screen can be that of an application window running on a computer, and thus the user can select such a view in order to be able to see other windows on the same computer monitor.

FIG. 4(*d*) is again a 4-way rectangular one, but this time the top and bottom views are positioned on the centerline of the screen. At first glance this view appears to have a disadvantage in that the total screen area in terms of total pixels is larger than that of FIG. 4(*a*). Indeed, if each view has a width W and height H, in pixels, then the screen size of FIG. 4(*a*) is 2W×2H whereas in FIG. 4(*d*) it is 3H×2W. However, perceptually the layout in FIG. 4(*d*) can have an advantage in that the subjects, assumed to be centered in each view, are closer to each other. This can be seen by computing the radius of the smallest circle that, centered on the screen's center point, will enclose the centers of all views shown on screen. A smaller radius indicates that the subjects of the views, assumed to be positioned in the centers of their respective views, are positioned closer to each other. This makes it much easier for a viewer to perceive, using both direct and peripheral vision, the actions in each view. The ratio of the radius of the circle over the height of the view is defined herein as the "view spread" of a particular layout and is denoted by 'v'.

FIG. 5(*a*)-(*b*) depict the matrix and staggered rectangular patterns in a 4-view case, showing also the various dimensions. For the 2×2 rectangular matrix shown in FIG. 5(*a*), the radius $R_M$ of the smallest enclosing circle will be:

$$R_M = \sqrt{\frac{W^2}{4} + \frac{H^2}{4}} \Rightarrow v_M \quad (1)$$

$$\equiv \frac{R_M}{H}$$

$$= \frac{1}{2}\sqrt{(W/H)^2 + 1}$$

$$= \frac{1}{2}\sqrt{r^2 + 1}$$

where r=W/H is the view aspect ratio.

For the case of the staggered 1×2×1 pattern shown in FIG. 5(*b*), the radius $R_S$ will be equal to H (since typically W/2<H) and thus:

$$v_s = \frac{R_S}{H} = 1 \quad (2)$$

Given that the view aspect ratio r is typically 4/3 or 16/9, the view spread for the matrix pattern will be 0.83 and 1.02, respectively. Thus the matrix pattern has a lower view spread than the staggered pattern for low aspect ratios, and slightly higher (by 2%) for high aspect ratios.

Returning to FIG. 4(e)-(g) depicted are similar layouts to FIG. 4(b)-(d), this time with 3 views. Notice that this time a matrix cannot be constructed (assuming all views have exactly the same size). These layout options are relevant for layout automation, as detailed below. These layout structures can be generalized for an arbitrary number of users. Possible limitations are the size of the screen (logical or physical), and the smallest view that is acceptable for viewing by a user. As the number of views grows, it becomes impossible to fit all of them on the screen, and hence automatic selection mechanisms must be used, as detailed below.

View spread discussed in the context of FIG. 5(a)-(b) can be generalized by considering non-rectangular patterns. A related problem from sampling theory is finding a sampling pattern that uses a minimum number of sampling points to reconstruct exactly a given bandlimited signal from its samples. For 2D isotropic spectra, i.e., circularly bandlimited 2D functions, the optimal sampling pattern is a lattice where the axes have an angle of 45 degrees resulting in a Voronoi tessellation composed of hexagonal shapes (see, e.g., D. P. Petersen and D. Midleton, "Sampling and Reconstruction of Wave-number Limited Functions in n-dimensional Euclidean Spaces" Inf. Control, 5:279-323, 1962). The Voronoi tessellation decomposes the 2-D plane into sets of points that are closest to one of the points on the lattice. Equivalently, the hexagonal tessellation pattern produces the least "empty" space when each hexagon is replaced by its inscribed disc (highest packing efficiency).

Using this property, layout patterns such as the one shown in FIG. 6(a)-(c) can be designed. FIG. 6(a) is a 5-way hexagonal standard mode layout, whereas FIG. 6(b) is a 5-way enlarged mode layout where the single enlarged view is shown at twice the size of the other participants. The hexagonal 'cell' can also be used rotated by 30°, so that two vertices are oriented vertically. An example for a 7-way standard mode layout with a rotated hexagonal pattern is shown in FIG. 6(c). Hexagonal layouts are increasingly effective with a high number of participants.

As with the matrix and staggered rectangular views, here as well the radius $R_H$ of the smallest circle that can enclose all four centers of view in a 4-way hexagonal layout can be computed, and thus the view spread can be obtained. For a regular hexagon with side S, its largest diameter is 2S and its smallest diameter is $S\sqrt{3}$. FIG. 7 illustrates that the height of each hexagon is its smallest diameter, i.e.:

$$H = S\sqrt{3} \quad (4)$$

Due to symmetry, the radius $R_H$ will be given by:

$$R_H = \frac{S}{2} + S = \frac{3}{2}S \quad (5)$$

Replacing S with H in the above equation results in:

$$R_H = \frac{3}{2}\frac{H}{\sqrt{3}} = \frac{\sqrt{3}}{2}H = 0.86H \Rightarrow v_H \equiv \frac{R_H}{H} = 0.86 \quad (6)$$

Using the rotated hexagon (see FIG. 6(c)), the height of each view is 2S whereas the radius is 3S/2, and hence the view spread is $v_{rotH}$=0.75, i.e., even lower. Comparing with the results for the matrix and staggered layouts, $v_{rotH}$ is significantly smaller than both $v_S$ (equal to 1) and $v_M$ (0.86 or higher).

The second category of layouts are the enlarged mode layouts. The difference with respect to standard layouts is that at least one view is shown at a size larger than the rest. FIG. 8(a)-(d) depicts several examples. FIG. 8(a) is a 3-way rectangular layout oriented horizontally with one enlarged view (view 1). Note that since view 1 has double the size of the rest, 2 views can be stacked to the side of view 1. FIG. 8(b) is that of a 6-way rectangular matrix. Here an enlarged view (view 1) is placed in the top-left corner of the screen, with the remaining views positioned around the enlarged one, to the right and bottom. FIG. 8(c) depicts the same 6-way view, this time oriented vertically. Notice that view 6 is placed at the centerline of the screen to distribute evenly the empty screen space. Finally, FIG. 8(d) is a 6-way layout with 2 enlarged views, organized in a rectangular matrix. The number of enlarged views P for a layout with N views can be between 0 and N−1 (if P=N or 0 then the mode is essentially the standard mode).

Staggered and hexagonal layouts (or, indeed, arbitrary layouts) can be combined together. FIG. 9(a)-(c) depicts combinations using staggered view in FIG. 9(a) as well as hexagonal views in FIG. 9(b)-(c). In all cases, the single enlarged view is shown as a large rectangle. Notice that in FIG. 9(c), the enlarged view is "recessed" behind views 2 and 5. This layout provides better use of the screen area, assuming that views 2 and 5 do not hide important information (this determination can be made by the user). An example of an enlarged mode layout using only hexagonal views is depicted in FIG. 6(b).

Given the large number of possibilities between different layout structures, it is important to properly guide a user through the possible choices. Clearly, the user should not be burdened to calculate how different views can fit together. He or she should rather provide indications to the Receiver system of his/her general preferences. Specifically, in an exemplary embodiment the user indicates to the Receiver system the size of the screen, and whether or not a standard or enlarged mode layout should be used. In the latter case, the user can also indicate the number of enlarged views to be used. If the Receiver is a standalone system, then the screen size can be fixed to be the entire display area of the system. For a particular setting of screen size and layout category, the user can also select between a view with a fixed number of participants, or an automatic view layout mode.

FIG. 10 depicts an exemplary videoconferencing user interface provided to the user at the Receiver. The interface is hosted in an application window which consists of an area available for displaying video and a menu bar providing access to the functionalities of the Receiver application. The application window provides means for resiting, following the standard look-and-feel policies of the host operating system, when present (e.g., by clicking and dragging at a corner of the window decoration provided by the operating system). In standalone systems the application window can occupy the entire screen, as no other application can be available to the user. In such a case the screen size can be considered fixed.

In an exemplary embodiment, the menu bar provides a button for selecting a layout preference. The button toggles between standard layout mode and active speaker layout mode. In FIG. 10 the standard mode layout configuration is selected. The figure also shows the actual views in a 4-way layout structure. If the 'Preview' option is set (by pressing the corresponding button), then one of the views is the local video preview obtained from the camera connected to the Receiver.

FIG. 11 depicts the same user interface, this time with the layout selection button toggled to enlarged mode. The button icon is suggestive of the layout category (notice the larger view rectangle on the button). FIG. 11 also shows an actual active speaker layout, with 6 views. Additional layout styles, e.g., hexagonal, can be similarly selected by expanding the choices offered by the layout selection button of the user interface.

For each of the layout categories, the user can select the largest number of views to be shown on screen. In the user interface of an exemplary embodiment, this is performed using the drop-down button to the right of the layout selection button. FIG. 12 shows the user interface when the drop-down button is pressed. The user is presented with a choice of 1 to 8 views, or automatic determination of the number of on-screen views. In FIG. 12 the automatic mode is selected. Other ranges for the number of views can be selected, e.g., 1-12, without any change in the operation of the processes presented here.

A process, in accordance with an exemplary embodiment, for obtaining a rectangular view layout will now be described. When the user is allowed to modify the screen size, the process is invoked during the application window resize process to ascertain if the size selected by the user results into a valid layout, given the parameters of the process. As the user drags the window border to resize the screen, a layout is calculated. Only if a valid result is found does the application draw the resize border of the window on the screen, suggesting to the user that this is an acceptable configuration. The following discusses rectangular layout configurations. Hexagonal layouts, and general tessellated layouts are discussed later on.

The inputs to the process can be:
the width W and height H of the screen in pixels,
the number N of views to include in the screen,
the number of enlarged views P,
the desired aspect ratio r of the views,
normalized cropping tolerances for the width and height, $C_W$ and $C_H$, respectively.

The process attempts to find the best fit of the specified number of views into the target screen size. The views are assumed to all have the same aspect ratio. This aspect ratio should be such that the an image with the desired aspect ratio r can fit into the views without cropping it more than the specified maximums $C_W$ and $C_H$ in the horizontal and vertical dimensions, respectively. In other words, the aspect ratio $r_s$ of the screen should satisfy:

$$(1 - C_W)r \equiv r_{min} \leq r_S \leq r_{max} \equiv \frac{r}{1 - C_H} \quad (7)$$

In an exemplary embodiment, r is set to 16/9, $C_W$ is set to 0.3, and $C_H$ is set to 0.

The set of all possible rectangular layouts considered by the system can be represented by a layout table T. Each entry in the table represents a specific view layout. Each entry is indexed by the number of views it contains, as well as an ordinal number within the set of layouts that have the same number of views. For a particular entry, and to be able to account for rectangles of arbitrary sizes, the table represents a layout using a K×L matrix of elementary rectangular "building blocks." Each view corresponds to a subset of these blocks that forms a proper rectangle. Note, however, that there can be blocks that do not belong to any view. For each entry, the particular views are specified by indicating the position of the upper-left corner of the view on the matrix, and the scale factor of the view as an integer number. The scale factor indicates how many blocks, both horizontally and vertically, the view will take. Note that the scale factor is applied to both dimensions, thus preserving the aspect ratio by design.

An example layout table entry is shown in FIG. 13(a). The figure shows a layout with 3 views (standard mode), in which the views are staggered. A 4×4 matrix of rectangular building blocks is needed in order to be able to specify the relative positioning of the views. View 0 is positioned at (1, 0), i.e., its top-left corner starts at that block, and its size is a factor of 2. This means that both horizontally and vertically it will occupy 2 blocks. The corresponding table entry for that view will thus be the triplet $\{1, 0, 2\}$. View 1 is positioned at (0, 2), and it also has a size factor of 2. It will be thus represented by the triplet $\{0, 2, 2\}$. Similarly, View 2 will be represented by $\{2, 2, 2\}$. The entire layout can thus be represented as: $\{4, 4, \{1, 0, 2\}, \{0, 2, 2\}, \{2, 2, 2\}\}$. An arbitrary layout table entry with N views can be represented as: $\{K, L, \{X_0, Y_0, S_0\}, \ldots, \{X_{N-1}, Y_{N-1}, S_{N-1}\}\}$, where $X_i$, $Y_i$, and $S_i$ correspond to the positioning and scale factor parameters of each view, respectively.

For a given layout, the symmetric layout created by reflecting the table entry along the main diagonal of the matrix is also a valid layout. Each layout table entry thus represents two distinct layouts. The reflection corresponds to an exchange of the x and y coordinates of the position of the top-left corner of each view as well as the dimensions of the building block matrix. In other words, table entry view $\{K, L, \{X_0, Y_0, S_0\}, \ldots, \{X_{N-1}, Y_{N-1}, S_{N-1}\}\}$ reflects to $\{L, K, \{Y_0, X_0, S_0\}, \ldots, \{Y_{N-1}, X_{N-1}, S_{N-1}\}\}$. FIG. 13(b) depicts the reflected layout obtained from FIG. 13(a). Since the reflected layouts are automatically considered, the table only needs to contain layouts that satisfy K>L.

A given layout is fitted on the target screen size as follows. The given layout is stretched to fit the target screen size. If this results in views with an aspect ratio in the desired range, then it is considered a match. If not, the layout is scaled down in one dimension so that the aspect ratio is in the valid range. In this case the layout will not cover the entire window, and it will be positioned in the center of the target screen size.

Let $W_L$ and $H_L$ correspond to the width and height, respectively, of the building blocks when the layout is displayed on the W×H screen. $W_L$ and $H_L$ are obtained from the following pseudo-code:

$$\text{if}\left(W > K\frac{H}{L}r_{max}\right)\{ \qquad \text{// wide screen case}$$

$$W_L = \frac{H}{L}r_{max}; H_L = \frac{H}{L};$$

$$\}\text{ else if}\left(W < K\frac{H}{L}r_{min}\right)\{ \qquad \text{// tall screen case}$$

$$W_L = \frac{W}{K}; H_L = \frac{W/K}{r_{min}};$$

$$\}\text{ else }\{ \qquad \text{// matching screen case}$$

$$W_L = \frac{W}{K}; H_L = \frac{H}{L};$$

$$\}$$

The effective aspect ratio $r_L$ of this layout for the particular screen size is defined as:

$$r_L = \frac{W_L}{H_L} \tag{8}$$

The positioning of a particular layout that has been fitted to a screen size is performed as follows. The layout can be characterized by $\{K, L, \{X_0, Y_0, S_0\}, \ldots, (X_{N-1}, Y_{N-1}, S_{N-1})\}$. In order to center the effective layout area $KW_L \times LH_L$ on the $W \times H$ target screen size it may be necessary to apply offsets horizontally or vertically. The offsets in the horizontal and vertical dimensions can be obtained as:

$$W_{offset} = \frac{W - KW_L}{2} \text{ and} \tag{9}$$

$$H_{offset} = \frac{H - LH_L}{2} \tag{10}$$

The i-th view will be positioned with a top-left corner positioned (in pixels) at:

$$x_i = W_{offset} + X_i W_L \tag{11}$$

and $$y_i = H_{offset} + Y_i H_L \tag{12}$$

and will have a size of $S_i W_L \times S_i H_L$ pixels.

FIG. 14 depicts the different sizing and positioning parameters using as an example the layout shown in FIG. 13(a), and particularly View 0, assuming a wide screen case.

For each layout described in the layout table (and their reflections), the above layout fitting process will produce a layout that can be placed on-screen. Clearly, some layouts, however, are preferred in terms of how well they fit in the target screen size. As an example, consider a layout with a vertical orientation that is being placed in a very wide screen. Although the above process will produce a solution, the resulting views will be very small while at the same time there will be a large amount of unused screen space to the left and right of the displayed layout. The disclosed subject matter thus introduces a scoring process that allows ranking of the results of the layout fitting process for a given screen size. The layout with the highest score is considered the best matching one for the screen size at hand, given the input parameters to the process.

The scoring in an exemplary embodiment of the disclosed subject matter uses a two-stage process. First, it considers a weighted average of the smallest size of the views that can be assigned to an enlarged and a regular view. In case of a tie, the scoring process then considers the total size of all partitions. If no enlarged views are requested, then the corresponding scoring component is ignored.

Let N be the number of views and P the number of enlarged views. Let $V = \{V^i, i=1, 2, \ldots\}$ be the set of layouts in the layout table T that contain N views. A layout $V^i$ is characterized by $\{K^i, L^i, \{X^i_0, Y^i_0, S^i_0\}, \ldots, (X^i_{N-1}, Y^i_{N-1}, S^i_{N-1})\}$. Let U be the subset of V that contains layouts for which there are at least P views that have a size factor S larger than the remaining N-P views. These views will be used as enlarged views. The sets V and U can be computed dynamically or, in another embodiment, they can be indicated by appropriate parameters in the layout table T. In other words, the table entries can be expanded to indicate directly both the number of views as well as the number of supported enlarged views. A layout can be characterized by the structure: $\{K^i, L^i, N^i, P^i, \{X^i_0, Y^i_0, S^i_0\}, \ldots, (X^i_{N-1}, Y^i_{N-1}, S^i_{N-1})\}$. This way, identifying the members of V and U can be done by sequentially scanning the table T and examining the parameters $N^i$ and $P^i$. Note that the layout fitting process only needs to be applied to the set U, after the input parameters are set.

The scoring of a particular layout in the set U is performed as follows:
1. Find the view j that has the P-th largest view size $\min_P = (S_j)^2 W_L H_L$. This is the smallest view size among the enlarged views. If P=0 or N, then $\min_P$ is set to 0.
2. Find the view k that has the smallest view size among all views $\min_N = (S_k)^2 W_L H_L$.
3. Compute the score s as:

$$s = (1-w)\min_P + w\min_N \tag{13}$$

where w is a weighting factor. In an exemplary embodiment w is set to $1/11$.

The ranking of all the layouts in U is then performed according to the following:
1. (Scoring) For each layout $U^i$ in U compute its score $s^i$. If the highest ranking layout is unique, then it is the selected one.
2. (Post-filtering) If two or more layouts produce the same score, then for each of these layouts compute their total size:

$$t^i = W_L H_L \sum_{j=0}^{N-1} (S^i_j)^2 \tag{14}$$

The layout with the highest score $t^i$ is the selected one.

The above process encourages the selection of layouts that result in large view sizes for enlarged participants, do not result in too small views for other participants, and provide good coverage of the given screen size. The process can be further simplified computationally by eliminating the constant $W_L H_L$ from the $\min_P$, $\min_N$, and $t^i$ calculations.

For large screen sizes, it can be preferable to take view spread into account rather than the total layout size $t^i$. 2 above can then be replaced by:
2b. (Post-filtering) If two or more layouts produce the same score, then if the screen height H is higher than $H_{thr}$ select the layout with the lowest view spread, otherwise select the one with the highest total size $t^i$.

In an exemplary embodiment $H_{thr}$ can be set to 720. This process takes into consideration that, for large screen sizes, it can be preferable to position the views so that they are more easily accessible in the field of view of the user.

Other scoring/filtering processes are of course also possible. Furthermore, ad-hoc data (not directly computed from layout parameters) can also be taken into account in the scoring process. For example, each layout table entry can be augmented by an explicit additional scoring component related to how appropriate or pleasing a particular layout can be for a particular application. This additional scoring component can be added to the scoring as described above, appropriately weighted, in order to encourage or discourage the selection of particular layouts. Denoting by $s_{adhoc}$ the additional ad-hoc scoring component and by x the associated weight, the equation for s becomes:

$$s = (1-w-x)\min_P + w\min_N + xs_{adhoc} \tag{15}$$

where the weights w and x are between 0 and 1 and satisfy $0 \le w+x \le 1$. In an exemplary embodiment the weights are set to $w=1/11$ and $x=5/11$.

The scoring process as described above will produce an output layout regardless of the input parameters. To avoid extreme situations, it can be augmented with additional constraints that filter out results that are not considered appropriate. For example, thresholds can be used regarding the minimum acceptable view size for any participant (e.g., 120 pixels). The set U can then be pruned (pre-filtering), after applying the layout fitting process, of any layout that does not satisfy this constraint. Similarly, a threshold can be set as a percentage of the screen that a layout can leave unused (e.g., 40%). This is expressed as the ratio $t^i/(WH)$ (i.e., $t^i/(WH)>0.4$).

Finally, some layouts can be considered unacceptable for aesthetic or application-specific reasons, regardless of their actual score. In cases where the layouts table is automatically generated by a script, a flag can be used in each layout table entry in order to signal layouts that are not acceptable. In other words, if such a flag is not set, then the layout is not considered at all in the scoring process (eliminated in the pre-filtering). One possible example from videoconferencing is a layout that resembles an inverted pyramid (e.g., a rectangular matrix layout with views positioned as 4:3:2:1).

In an exemplary embodiment, during the process of interactively resizing the target screen, a particular size selection is considered acceptable of the above layout selection process produces a valid layout. If not, then the user is not allowed to keep the particular screen configuration.

FIG. 15 depicts a block diagram of the above exemplary layout selection process. N and P are set at 1501. Whenever W or H are modified at 1502, offsets $W_{offset}$ and $H_{offset}$ as well as the block sizes $W_L$ and $H_L$ are computed at 1503. The process then proceeds to iterate over the layouts stored in the layouts table 1504, obtaining at 1506 the layout(s) with the maximum score. Note that not all layouts need to be considered; as shown in FIG. 15, the layouts are pre-filtered at 1505 (to construct the set U, prior to scoring) based on the values of the N and P parameters, as well as any other constraints that can have been placed (e.g., minimum view size). The results of the scoring process (zero or more layouts) are post-filtered at 1507. If at least one result is found at 1508, the layout is applied and the process terminates at 1509. Otherwise it returns to a state awaiting new values for W and H at 1502. The process is also used whenever there is a change in N or P in the Receiver application.

As soon as a particular layout becomes effective, the Receiver 307 informs the Server 305 via the signaling path 306, including the dimensions of the views of each stream (see FIG. 3). The Server 305 can then decide which scalable layers from each stream to forward to the Receiver 307. Note that in some cases, as explained below, it can be the case that a stream is not displayed at all and thus the Server 305 can send no data at all for the particular stream. The coupling of the layout management at the Receiver 307 with the selective forwarding function of the Server 305, made possible due to scalable coding, produces an extremely effective solution that maximizes flexibility while at the same time minimizes the required bit rate.

Thus far the relationship of the number of streams present in the system versus the number of available views on the screen has not been addressed. It is assumed that the user selected a number of desired views, and possibly a number of desired enlarged views. The number of available streams, can be smaller, equal to, or greater than the number of desired views. Similarly, the availability streams for assignment to each of the views, be it of the enlarged or standard type has not been addressed. It is noted that it is always possible to allow a user at the Receiver to manually assign streams to views. For example, the user can be allowed to select a particular layout, and drag-and-drop streams from a displayed list to layout positions to assign a stream to a particular view. The disclosed subject matter provides a process that jointly addresses both of these issues in an automated way. This can ensure optimal use of the available screen space and the number of views, in that the system can automatically switch streams from standard to enlarged views (e.g., when there is speech activity in a videoconference), or automatically switch layouts as streams are added to, or removed from, the system.

First, regarding the relationship of the number of available streams to the number of available layout views, in the case where there are fewer streams available than the views provided for display, the Receiver can leave unused views empty, optionally displaying a logo image or other pre-determined information. The selection of the views that will remain unused or, equivalent, the selection of the views to be used can be performed in a number of ways. One example is to first allocate enlarged views, using a raster-scan process of the layout, and then proceed to allocate standard views, following the same pattern. As this will tend to leave the bottom of the screen unused, alternative scanning patterns to the raster-scan can be devised so that they allocated views as close as possible a rectangular area.

In an exemplary embodiment the order in which views are entered in the layout table can be considered the desired order for view allocation. This way the layout table by design indicates the desired allocation strategy, which can be fully customized for each layout table entry. Regardless of the specific allocation strategy, this process will leave unused some non-trivial portion of the screen; the Receiver can opt to center the screen in this case in order to distribute the empty space equally on the four sides of the displayed layout.

In an exemplary embodiment, a Receiver can attempt to use a layout that does not leave any views unused, and thus in a situation where the number of available streams becomes smaller than the number of available views it can preferably switch to a different layout that provides the same number of views as the number of available streams. In doing so, it can preferably retain the same number of enlarged views as with the current layout. In other words, if the current layout is configured with N views and P enlarged views, for a total of M=N streams, and one stream is eliminated from the session, the Receiver will attempt to use a layout with N−1 views and P enlarged views.

If the number of available views equals the number of available streams, then the assignment of each stream to each view is the only concern. If the number of available streams is higher, then there is a need to identify which streams will not be assigned a view. The stream prioritization used in the disclosed subject matter provides a natural ordering mechanism that addresses both of these problems in a unified way.

The prioritization process in an exemplary embodiment relies on audio activity information. In an exemplary embodiment the audio activity can be computed as the volume of the audio signal (e.g., short-term average energy computed over a sliding window). In alternative embodiments, suitable for broadcast-type applications, it can be an indicator of speech activity (versus music or effects). Audio activity can be computed at the Sender, Server, or Receiver. In an exemplary embodiment it is computed at the Sender. This allows the Server and Receiver to easily rank the streams in order of decreasing audio activity. Assume that there are M available streams and that N<M to be displayed using the current layout. A number of them, P<N, can correspond to enlarged views. Let A(i) denote the audio activity indicator for stream i, where higher values indicate higher activity.

The view allocation process operates asynchronously whenever there is a change in M, N or P, and periodically otherwise (to capture changes in audio activity). In an exemplary embodiment the period can be set to 1 sec. As the view allocation process operates over time, it needs to know which stream is assigned to each view in the current layout. It is assumed that streams are associated with an identifier, and that this identifier is associated with each view to indicate the assignment of the stream to the particular view. The identifier can be, for example, a unique integer that the Receiver assigns to each stream, a pointer to a memory structure that describes the stream, etc. This way the view allocation process can identify which stream is shown in each view, and vice versa.

FIG. 16 shows a block diagram of the view allocation process in accordance with an exemplary embodiment. First, because it is assumed that a new layout is applied, such as when the application starts or when there is a change in N or P (layout initialization), the process begins at 1601 when triggered by these circumstances. As discussed below, the process sorts at 1602 M streams, by decreasing audio activity A, into a list F.

The two 'for' loops 1604 and 1605 correspond to the two passes over the list F, as detailed below. The first pass can be bypassed at 1603 on application (or session) initialization, i.e., when there is no previous layout used.

The view allocation process will allocate the P enlarged views to the streams with the P highest values of A, and the remaining N-P standard views to the N-P views with the next N-P highest values of A. As stated above, in an exemplary embodiment the order of allocation of views in a particular layout is the order in which they are entered in the layout table entry they belong to.

If the number of available streams M is greater than N, then the view allocation process can eliminate from the screen the streams with the smallest audio activity. In case there are streams with the same audio activity and the set of M-N streams to be eliminated cannot be determined by the audio activity alone, the view allocation process preferably randomly resolves the ties where needed. For example, if there are 2 streams with activity 0 and 3 streams with activity 1, and 4 streams must be eliminated, then the view allocation process first selects the 2 streams with 0 activity for elimination. It then uses a random number generator that provides random numbers between 0 and I. If the value is between 0 and ⅓ then the first stream with activity 1 is eliminated; if it is between ⅓ and ⅔ the second one is eliminated, and so on. The process can be repeated if more than one stream has to be randomly eliminated.

When the layout initialization is the result of a change in N or P, the view assignment operates as shown in 'for' loop 1604. The view allocation process will allocate the P enlarged views to the streams with the P highest values of A, and the remaining N-P standard views to the N-P views with the next N-P highest values of A. When allocating a particular stream to a view in either category, the process ranks the candidate views in the new layout by first computing the size, in pixels, of the intersection of each candidate view with the view that the stream occupied in the previously used layout if any. In other words, by using the view with the highest overlap, the view allocation process tries to ensure that a stream that was visible in the previous layout will occupy a position in the new layout that is in close physical proximity to the previous one. This ensures that a particular stream will move to a nearby position on the user's screen, avoiding confusion.

Since, in general, not all of the N streams to be assigned can have had views assigned to them in the previous layout, the view allocation process uses a two-pass process. It first processes 1604 the streams that have had views assigned to them in the previous layout, in order of decreasing audio activity, assigning them to the views with the highest overlap with their previous view positions. It then processes 1605 the remaining streams, again in order of decreasing audio activity, assigning them to the remaining views.

The randomization process for the case M>N is not explicitly shown in the diagram, and can be performed as part of the sorting 1602, when necessary.

FIG. 17 illustrates a block diagram of the operation of the view allocation process triggered at 1701 as part of its periodic application or due to a change in M (without a change in N or P), i.e., layout reprocessing. The streams are sorted at 1702 according to their activity in a list F. The top P will be assigned to enlarged views. Each one of the top P streams of F is processed in sequence of decreasing activity A. 'For' loop 1703 illustrates the following three situations, and how the process handles each.

1) If the currently processed stream already occupies an enlarged view then it retains it, in exactly the same layout position.

2) If it already occupies a standard view, then it replaces the enlarged view that has the lowest activity A, which in turn is assigned to the standard view of the stream that replaced it. The replaced stream is removed from the list F, if present, as it has already been assigned a view. Note that a stream that previously had an enlarged view may not be in F if the stream is no longer part of the system (e.g., a participant left a videoconferencing session).

3) If the stream does not occupy any view (it is a new stream or it was previously not displayed), then it replaces the enlarged view that has the lowest activity A; the enlarged view that is being replaced is placed in a standard view candidate list G and is removed from F, if present.

The stream that was just assigned an enlarged view is removed from F in all of the above three cases.

By sequentially processing the P top-ranked views, the current set of enlarged views is determined, resulting in a set F of unallocated streams intended for standard mode views, as well as a set G of standard view candidate streams that have resulted from their elimination from enlarged views. Both lists are sorted (not shown) according to their audio activity, by construction if they are implemented as First In-First Out (FIFO) lists. It is noted that the number of available standard views can be less than N-P, as some of the enlarged views that were replaced may have been assigned standard views by the above process. Let $Q=\max\{N-P-|G|, 0\}$ be the number of available standard views, where $|x|$ denotes the size of the list x, i.e., $|G|$ denotes the size of list G. Q represents the number of free standard view slots, assuming the views in G all get assigned a view. Note that typically Q>0, since in typical layout configurations P is less than or equal to N/2.

The view allocation process gives priority to the streams in G over the streams in F. At the same time, if a stream in F is already present in the current layout, it should not be moved to a different position. The 'for' loop 1704 thus examines the Q highest ranking streams in F. If they are already associated with a view, they are retained; otherwise, they are allocated one of the free standard views. Finally, the process allocates at 1705 the remaining $|G|$ standard views to the views in G. In an exemplary embodiment, this completes at 1706 the view allocation process.

In an exemplary embodiment, the view allocation process ensures that the streams with the highest audio activity are always represented onscreen. It can also ensure that enlarged views are "gradually" eliminated from a layout, moving from enlarged, to standard, to not visible. The reverse direction, however, does not need to be gradual; a new stream, for example, added to a session can immediately occupy an enlarged view (e.g., a participant who just joined a session and started speaking). Clearly, variations of this view allocation technique are possible, depending on the application. The exemplary design detailed herein is well-suited for videoconferencing applications, where audio activity corresponds to a participant being silent or not.

The view allocation process as described above treats the case where N or P changes in the same way as when the application is initialized. In other words, if a user switches from a layout with N=3 and P=1 to N=2 and P=1, the process will not consider what were the stream-view relationships prior to the application of the new layout. This is because the spatial positioning of views from one layout to another can be very different. In other words, in general there is no guarantee that the enlarged view in this example will be positioned in the same screen location in both layouts. In practice, however, since variations in N are typically the result of variations in M in which the Receiver automatically adjusts the layout, and changes in M are typically gradual (one stream added or removed), the process can be modified in order to take spatial positioning into account.

It is noted that the functionality described here is separate and complementary to the SACS functionality made possible by scalable audio coding. Similar to the case of video and the SVCS, the SACS can automatically transmit base and enhancement layer(s) for enlarged views (when present), base and enhancement or only base for standard views, and no audio for streams not shown in the current layout. The signaling to the SACS is performed as soon as a particular layout is selected and applied.

As was indicated in FIG. 12, an exemplary embodiment also allows the user to avoid explicitly specifying the number of views to be shown on screen, but rather let the system automatically select an appropriate number. This is particularly useful for sessions where there is a large number of streams. The user in this case only selects the desired screen size. For a standalone system, the screen size can be assumed to be fixed.

The automatic mode of the system works in exactly the same way as the fixed view modes. The only difference is that the layout selection process will score layouts with any number of participants, up to the number of available streams. In other words, the set U will now include all layouts with the number of views from 1 to M, instead of only the layouts with N views. In the automatic mode, the user can still select the number of enlarged views. Typical values for the number of enlarged views for large sessions can be 0 or 1. The enlarged view allocation in the automatic mode case operates identically to the fixed mode case, after the best layout has been selected (among layouts that match the number of enlarged views) and the number of available views is determined.

The preceding description of how layouts are described in the layout table and how the best fitting layout is selected assumed rectangular views. As mentioned earlier, layouts can contain arbitrary view sizes. A case of particular interest is hexagonal or rotated hexagonal views of the same size, as shown in FIGS. 6(a) and (c). In general, any shape that tessellates the 2D space (covering the entire plane when replicated with no gaps) can be used. The replication will occur on a two-dimensional periodic lattice. Practical considerations regarding video views, such as the need to fit the aspect ratio of at least a human head and the need for horizontal symmetry, limit the shape choices. For example, a rhombus can limit the upper and lower parts of an image.

For non-rectangular views that are generated by tessellation on a 2D lattice, the existing layout table can be used noting that the 2D lattice can be considered as a basis rotation of the regular axes. For the case of the rotated hexagon, the generating lattice has the y axis at an angle of 45°. Hence the placement of views (of identical size) within a layout can be determined by using fundamental blocks in these rotated axes as with the rectangular block case. Using the 7-way rotated hexagonal layout of FIG. 6(c) as an example, its layout table entry indicates {3, 3, {0, 0}, {1, 0}, {0, 1}, {1, 1}, {2, 1}, {1, 2}, {2, 2}}. Note that since all views have the same size, there is no need to specify the scale factor. Alternatively, to maintain consistency with the rectangular view case, the number 1 could be added in each view. The same methodology can be applied to the regular hexagon, where in the generating lattice the x axis is slanted by 45°.

In order to identify these special layouts, and the different interpretation of their representation, a flag can be added to the layout table. This can also be needed in order to properly apply the scoring functions defined earlier in the case of rectangular layouts, using the correct formulas for the width, height, and area of each hexagonal view.

When different view shapes or sizes are combined in a layout, it is not trivial to generalize the layout description. These cases can be treated as exceptions in the layout table. The calculations for the individual view sizes and the fitness score can be performed by special code dedicated to the particular layout. These special cases can be identified by a flag added to the layout table, as well as function pointers, also added to the layout table, that compute the view sizes and fitness score for a particular screen size.

The ability to simultaneously offer multiple views at different resolutions at a Receiver is a unique feature of scalable video coding and the SVCS architecture. The fact that the composition of the individual streams is performed by the Receiver, rather than a server, provides more flexibility to Receiver to accommodate both varying stream resolutions as well as individual user preferences. An additional flexibility is in handling streams that combine 4:3 and 16:9 picture aspect ratios or, in general, different picture aspect ratios. Recall that in the layout fitting process the layout aspect ratio $r_L$ can be within a range of minimum and maximum values as specified by the parameters $C_W$ and $C_H$. If the screen aspect ratio does not match the exact stream aspect ratio, then in order to position a stream within a view the picture of the stream must be cropped prior to scaling and display. The cropping required for a stream occupying view i will be $W_{crop}=C_W W_S/2$ pixels horizontally (left and right) and $H_{crop}=C_H H_S/2$ pixels vertically (top and bottom), where $W_S$ and $H_S$ are the width and height, respectively, of the stream's picture.

Figure 18A:
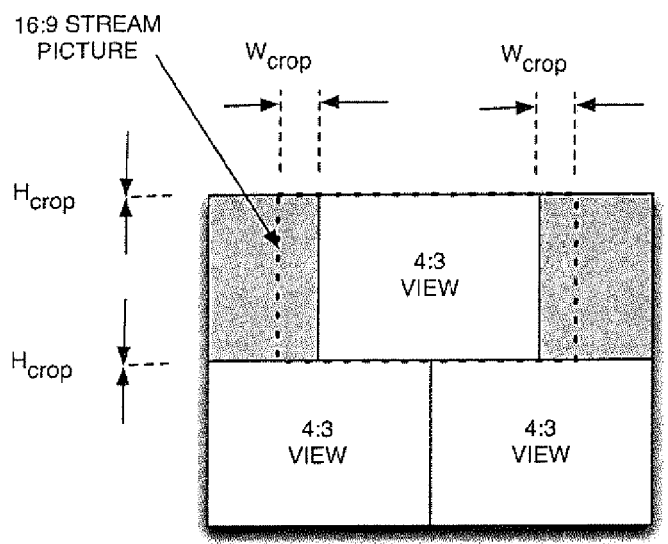
FIG. 18(a)-(b) depict the cropping and manual panning of view streams with different aspect ratios are combined in a layout, in accordance with the principles of the disclosed subject matter.

FIG. 18(a) shows an example layout with three rectangular view with view aspect ratio 4:3. The top view is associated with a stream having a 16:9 picture aspect ratio. In order to display the stream in the view, the picture is cropped, in this example only at the left and right sides ($H_{crop}=0$). Cropping is shown in this example to be symmetrical (equal on both sides), centering the stream's picture within the view.

The cropping is applied after decoding takes place, since the cropped area is still needed in the prediction loop of the stream's decoder. Since the full resolution, un-cropped picture, is available at the Receiver, the GUI of the Receiver application can allow a user to manually pan the displayed view, left-to-right or top-to-bottom, depending on if cropping is applied horizontally or vertically, respectively. Panning amounts to the distribution of the cropped area to the left and right or top and bottom parts of the picture. In an exemplary embodiment, the user can click and drag the picture in a view in order to pan it in either direction. This manual palming option can be enabled in any view that is subject to cropping.

With this scheme, a screen size that results in a 4:3 layout aspect ratio can host both 4:3 and 16:9 streams: the 16:9 streams will be horizontally cropped, but the user will still be able to select the pan position of each view to ensure that the subject matter of interest is fully shown in the respective view.

Figure 18B:
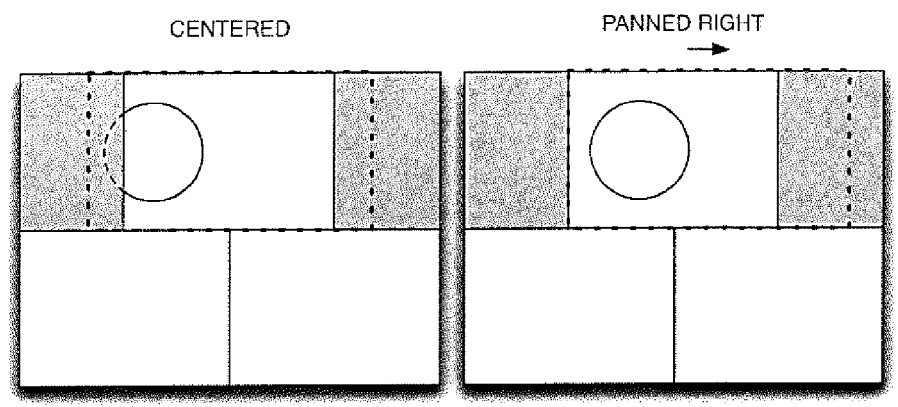

FIG. 18(b) shows an example where when the picture within the view is centered, part of a subject (represented here by a circle) is outside the view. By clicking and dragging the picture to the right, the view is panned right. The stream picture is moved to the right, and the entire subject is now inside the view and thus fully visible.

In addition to manual panning, the Receiver can also offer a manual zoom mode. This is very useful in case the user wants to size a particular view so that the subject appears in a similar size as the subjects in nearby views. One example from a videoconferencing system is the case where the Receiver receives a VGA stream from a desktop user and another stream from an HD camera installed in a videoconferencing room. A room camera will typically show a person in much smaller size than the desktop camera. By allowing the user to zoom (and pan) in the HD stream view, the sizes can be made comparable. In an exemplary embodiment zooming can be implemented by shift-clicking and dragging within a view, where dragging upwards indicates the zoom-in operation and dragging downwards indicates the zoom-out operation.

In addition to offering zooming and panning as manual, user-operated modes, a system can also offer automatic panning and zooming. One way to permit a system to automatically compute zooming and panning parameters is to tag the video streams with information about the field of view and subject distance and positioning (either computed by the camera or measured manually). This, however, may not be practical in all situations. For example, manual tagging techniques can make it difficult to physically adjust the camera at will, as all parameters need to be recomputed. It is possible, however, to employ techniques (discussed below) at the Receiver in order to detect the presence and position of subjects of importance, such as people. Specifically in the field of videoconference, where video content is typically head-and-shoulders images, techniques for automated scene analysis can be very effectively used.

A robust method for detecting the general location of a head in head-and-shoulders video that is typical in videoconferencing systems is described, for example, in A. Eleftheriadis and A. Jacquin, "Automatic Face Location Detection and Tracking for Model-Assisted Coding of Video Teleconferencing Sequences at Low Bit Rates," Signal Processing: Image Communication, Vol. 7, Nr. 3, September 1995, pp. 231-248, incorporated herein by reference in its entirety. The particular method fits an ellipse (which models a head) to a position within each picture. The objective of the method is not to obtain a perfect outline of the subject, but rather to detect its general location. Different methods can also be used to the same effect. The subject location information can be used in the context of layout management, as it provides important information about the location and size of the subject within the view.

In an exemplary embodiment, the system offers an automatic pan-and-zoom mode, where subject location detection is used to modify the pan and zoom factors of high resolution participants when selected by the user at the Receiver.

The method operates as follows. For each view (regardless of resolution), the position and size of the subject is obtained from the decoded video signal using techniques such as the one cited above. A target subject size is then computed by averaging the subject sizes across all low resolution participants. Other metrics can also be used, such as the median or maximum. The zoom factor for the high resolution views is then set to be equal to the ratio of the high resolution subject size to the target subject size. The high resolution view size is determined by the layout process as described earlier. The high resolution view is then defined by cropping the high resolution decoded picture to the desired size, ensuring that the subject matter is centered within the cropped region, and down/up-sampling it by the computed zoom factor so that the resulting scaled and cropped picture fits the assigned view. To avoid abrupt and continuous pan or zoom setting changes, the pan and zoom parameters can be controlled by a first order HR filter ($x'[n]=ax[n]+(1-a)x'[n-1]$, where a can be set to 0.1) to dampen variations.

The same method can be used to pan and zoom views within a hexagonal view. As the aspect ratio of a hexagon is equal to $2/\sqrt{3}=1.15$, it is smaller than both the standard resolution aspect ratio of 4:3 and the wide-screen resolution aspect ratio of 16:9. As a result, it is advantageous to be able to automatically pan and zoom the image to optimize its placement in a view.

It will be understood that in accordance with the disclosed subject matter, the techniques described herein can be implemented using any suitable combination of hardware and software. The software (i.e., instructions) for implementing and operating the aforementioned layout management techniques can be provided on computer-readable media, which can include, without limitation, firmware, memory, storage devices, microcontrollers, microprocessors, integrated circuits, ASICs, on-line downloadable media, and other available media.

What is claimed is:

1. An audiovisual communication system for transmitting a plurality of video signals and associated audio signals, if any, over a communication network for presentation to one or more end users, wherein the video signals are scalably coded into layers including a base layer and one or more enhancement layers, the system comprising:
   a receiver configured to receive the plurality of video and any associated audio signals over the communication network, determine a layout for the displayed video signals based on a set of criteria, and communicate information about the determined layout;
   a display, connected to the receiver, configured to display one or more of the received video signals using the determined layout; and
   one or more servers, connected to the communication network, adapted to receive the information about the determined layout, and configured to transmit the plurality of video and any associated audio signals over the communication network;
   wherein the one or more servers are configured to selectively transmit, for each of the plurality of video signals, no layers, the base layer, or the base layer and one or more enhancement layers, if any, that are necessary for displaying the video signals in the determined layout.

2. The system of claim 1 wherein at least one of the plurality of video and associated audio signals are precompressed, and wherein the one or more servers are further configured to access said precompressed video and associated audio signals from local or remote storage.

3. The system of claim 1 wherein at least one of the plurality of video and associated audio signals are compressed in real-time, and wherein the one or more servers are further configured to encode said real-time compressed video and associated audio signals from a video or audio source attached to the one or more servers.

4. The system of claim 1 wherein at least one of the one or more servers are further configured to obtain one or more of said plurality of video and associated audio signals from transmitting systems connected to the at least one of the one or more servers over the communication network.

5. The system of claim 1 wherein the associated audio signals are scalably coded into layers including a base layer and one or more enhancement layers, and wherein the one or more servers are further configured to selectively transmit only the data of the audio signal layers that are necessary for the determined layout.

6. The system of claim 1 wherein the one or more servers are further configured to determine which of the audio signals to selectively transmit by using audio activity indicators for each of the associated audio signals and an indication of whether the associated video signal is displayed in the determined layout, such that audio signal data is transmitted for one or more of the audio signals with the highest activity and audio signal data associated with one or more of the video signals that are displayed in the determined layout is transmitted, and no audio signal data is transmitted associated with the remaining video signals.

7. The system of claim 6 wherein the associated audio signals are scalably coded into layers including a base layer and one or more enhancement layers, and wherein the one or more servers are further configured to selectively transmit both base and enhancement layer audio signal data for one or more audio signals with the highest activity indicators, and base layer audio signal data for one or more of the audio signals associated with the one or more of the video signals that are displayed in the determined layout.

8. The system of claim 6 wherein the audio activity indicators are computed at the one or more servers.

9. The system of claim 6 wherein the audio activity indicators are precomputed and are available to the one or more servers in combination with the video signals and associated audio signals.

10. The system of claim 1 wherein the receiver is further configured to determine a layout for a target screen size by accessing a table of potential layouts, selecting one or more candidate layouts from the table of potential layouts using a first set of criteria, fitting each candidate layout in the target screen size, and selecting to use zero or one of the candidate layouts based on a second set of criteria.

11. The system of claim 10 wherein the first set of criteria includes the total number of views available in the layout being equal to a number N.

12. The system of claim 10 wherein the first set of criteria includes the total number of views available in the layout being equal to a number N and a number of views being equal to a number P with a size that is bigger than the remaining N-P views.

13. The system of claim 10 wherein the first set of criteria includes having a layout with a total number of views less than or equal to the number of video signals M received by the receiver.

14. The system of claim 1 wherein the receiver is further configured to determine a layout such that the number of views in the determined layout produces an aggregate bit rate of the video signal received by the receiver that is within a limit.

15. The system of claim 1 wherein the receiver is further configured to determine a layout such that the number of views in the determined layout produces an aggregate number of pixels to be decoded that is within a limit.

16. The system of claim 1 wherein the receiver is further configured to determine a layout automatically based on the number of received video signals.

17. The system of claim 1 wherein the receiver is further configured to allow a user to pan one or more of the displayed plurality of video signals manually within an assigned view if the one or more of the displayed plurality of video signals is cropped within the assigned view in the determined layout.

18. The system of claim 1 wherein the receiver is further configured to automatically detect the presence and location of a subject's head in one or more of the plurality of displayed video signals, if the one or more of the plurality of displayed video signals is cropped within an assigned view in the determined layout, and to pan the one or more displayed video signals within the assigned view such that the subject's head is in full view.

19. A method for transmitting a plurality of video signals scalably coded into layers including a base layer and one or more enhancement layers and associated audio signals, if any, over a communication network for presentation to one or more end users, comprising:
    determining a layout to display the plurality of video signals based on a set of criteria;
    communicating information about the determined layout; and
    selectively transmitting only the data of the video signal layers that are necessary for displaying the video signals in the determined layout and any associated audio signals;
    receiving the selectively transmitted data; and
    displaying the plurality of video signals utilizing the determined layout.

20. The method of claim 19 wherein at least one of the plurality of video and associated audio signals are precompressed, further comprising:
    accessing said precompressed video and associated audio signals from local or remote storage.

21. The method of claim 19 wherein at least one of the plurality of video and associated audio signals are compressed in real-time, further comprising:
    encoding said real-time compressed video and associated audio signals from a video or audio source.

22. The method of claim 19, further comprising:
    obtaining one or more of said plurality of video and associated audio signals from transmitting systems.

23. The method of claim 19 wherein the associated audio signals are scalably coded into layers including a base layer and one or more enhancement layers, further comprising:
    selectively transmitting only the data of the associated audio signal layers that are necessary for the determined layout.

24. The method of claim 19, further comprising:
    determining which of the audio signals to selectively transmit by using audio activity indicators for each of the associated audio signals and an indication of whether the associated video signal is displayed in the determined layout, such that audio signal data is transmitted for one or more of the audio signals with the highest activity and audio signal data associated with one or more of the video signals that are displayed in the determined layout is transmitted, and no audio signal data is transmitted associated with the remaining video signals.

25. The method of claim 24 wherein the associated audio signals are scalably coded into layers including a base layer and one or more enhancement layers, further comprising:

selectively transmitting both base and enhancement layer audio signal data for one or more audio signals with the highest activity indicators, and base layer audio signal data for one or more of the audio signals associated with the one or more of the video signals that are displayed in the determined layout.

26. The method of claim 19, further comprising:
determining a layout for a target screen size by accessing a table of potential layouts, selecting one or more candidate layouts from the table of potential layouts using a first set of criteria, fitting each candidate layout in the target screen size, and selecting to use zero or one of the candidate layouts based on a second set of criteria.

27. The method of claim 26 wherein the first set of criteria includes the total number of views available in the layout being equal to a number N.

28. The method of claim 26 wherein the first set of criteria includes the total number of views available in the layout being equal to a number N and a number of views being equal to a number P with a size that is bigger than the remaining N-P views.

29. The method of claim 26 wherein the first set of criteria includes having a layout with a total number of views less than or equal to the number of video signals M received by the receiver.

30. The method of claim 19, further comprising:
determining a layout such that the number of views in the determined layout produces an aggregate bit rate of the received video signal that is within a limit.

31. The method of claim 19, further comprising:
determining a layout such that the number of views in the determined layout produces an aggregate number of pixels to be decoded that is within a limit.

32. The method of claim 19, further comprising:
determining a layout automatically based on the number of received signals.

33. The method of claim 19, further comprising:
allowing a user to pan one or more of the plurality of displayed video signals manually within an assigned view if the one or more of the plurality of displayed video signals is cropped within the assigned view in the determined layout.

34. The method of claim 19, further comprising:
automatically detecting the presence and location of a subject's head in one or more of the plurality of displayed video signals if the one or more of the plurality of video signals is cropped within an assigned view in the determined layout; and
panning the one or more displayed video signals within the assigned view such that the subject's head is in full view.

35. A system for presenting a plurality of video signals and associated audio signals, if any, received over a communication network from one or more servers, and wherein the video signals are scalably coded into layers including a base layer and one or more enhancement layers, comprising:

a receiver configured to:
receive the plurality of video and any associated audio signals from the communication network;
determine a layout for the display of one or more of the received video signals based on a set of criteria; and
communicate the determined layout over the communications network as feedback; and
a display, connected to the receiver, configured to display one or more of the received video signals using the determined layout;
wherein the feedback comprises instructions for the selective transmission of the video signal layers, if any, in the determined layout.

36. The system of claim 35 wherein the associated audio signals are scalably coded into layers including a base layer and one or more enhancement layers, and wherein the feedback further comprises instructions for the selective transmission of audio signal layers in the determined layout.

37. A system for transmitting a plurality of video signals and one or more associated audio signals, wherein the video signals are scalably coded into layers including a base layer and one or more enhancement layers, comprising:
one or more servers configured to:
receive instructions for the selective transmission of the video signal layers corresponding to a determined layout; and
selectively transmit only the data of the video signal layers that are necessary for displaying the video signals in the determined layout.

38. The system of claim 37 wherein the receiver is further configured to determine a layout for a target screen size by accessing a table of potential layouts, selecting one or more candidate layouts from the table of potential layouts using a first set of criteria, fitting each candidate layout in the target screen size, and selecting to use zero or one of the candidate layouts based on a second set of criteria.

39. The system of claim 37 wherein the one or more associated audio signals are scalably coded into layers including a base layer and one or more enhancement layers, and wherein the instructions further comprise instructions for the selective transmission of audio signal layers in the determined layout.

40. The system of claim 37 wherein the one or more associated audio signals are scalably coded into layers including a base layer and one or more enhancement layers, and wherein the one or more servers are further configured to:
selectively transmit both base and enhancement layer audio signal data for one or more audio signals with the highest activity indicators, and base layer audio signal data for the audio signals associated with the one or more of the video signals that are contained in the determined layout.

41. A non-transitory computer readable medium comprising a set of executable instructions to direct a processor to perform the methods recited in one of claims 19-34.

* * * * *